US011332656B2

(12) United States Patent
Al-Yami et al.

(10) Patent No.: US 11,332,656 B2
(45) Date of Patent: May 17, 2022

(54) LCM COMPOSITION WITH CONTROLLED VISCOSITY AND CURE TIME AND METHODS OF TREATING A LOST CIRCULATION ZONE OF A WELLBORE

(71) Applicant: Saudi Arabian Oil Company, Dhahran (SA)

(72) Inventors: Abdullah S. Al-Yami, Dhahran (SA); Vikrant Wagle, Abqaiq (SA); Ali Alsafran, Dhahran (SA); Khawlah A. Alanqari, Al-Khubar (SA); Sara A. Alkhalaf, Alkhobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/718,716

(22) Filed: Dec. 18, 2019

(65) Prior Publication Data
US 2021/0189218 A1  Jun. 24, 2021

(51) Int. Cl.
| E21B 33/138 | (2006.01) |
| C09K 8/508 | (2006.01) |
| C08L 63/00 | (2006.01) |
| E21B 21/00 | (2006.01) |

(52) U.S. Cl.
CPC ............ *C09K 8/5086* (2013.01); *C08L 63/00* (2013.01); *E21B 21/003* (2013.01); *E21B 33/138* (2013.01)

(58) Field of Classification Search
CPC ..... C09K 8/5086; C08L 63/00; E21B 21/003; E21B 33/138
See application file for complete search history.

(56) References Cited

U.S. PATENT DOCUMENTS

| 602,375 A | 4/1898 | Suydam |
| 3,250,330 A | 5/1966 | Smith, Jr. |
| 3,476,189 A | 11/1969 | Bezemer et al. |
| 3,565,176 A | 2/1971 | Wittenwyler |
| 3,646,999 A | 3/1972 | Hamby, Jr. et al. |
| 3,915,232 A | 10/1975 | Gruesbeck |
| 4,003,873 A | 1/1977 | Smith |
| 4,042,032 A | 8/1977 | Anderson et al. |
| 4,072,194 A | 2/1978 | Cole et al. |
| 4,199,484 A | 4/1980 | Murphey |
| 4,247,430 A | 1/1981 | Constien |
| 4,665,988 A | 5/1987 | Murphey et al. |
| 4,730,675 A | 3/1988 | Wygant et al. |
| 4,749,042 A | 6/1988 | Wu |
| 4,799,553 A | 1/1989 | Wu |
| 5,178,218 A | 1/1993 | Dees |
| 5,712,314 A | 1/1998 | Surles et al. |
| 5,770,657 A | 6/1998 | Chou et al. |
| 5,873,413 A | 2/1999 | Chatterji et al. |
| 5,875,844 A | 3/1999 | Chatterji et al. |
| 5,875,845 A | 3/1999 | Chatterji et al. |
| 5,911,282 A | 6/1999 | Onan et al. |
| 5,959,061 A | 9/1999 | Neumann et al. |
| 6,016,870 A | 1/2000 | Dewprashad et al. |
| 6,124,246 A | 9/2000 | Heathman et al. |
| 6,196,316 B1 | 3/2001 | Bosma et al. |
| 6,234,251 B1 | 5/2001 | Chatterji et al. |
| 6,271,181 B1 | 8/2001 | Chatterji et al. |
| 6,316,529 B1 | 11/2001 | Temme et al. |
| 6,321,841 B1 | 11/2001 | Eoff et al. |
| 6,328,106 B1 | 12/2001 | Griffith et al. |
| 6,448,206 B1 | 9/2002 | Griffith et al. |
| 6,450,260 B1 | 9/2002 | James et al. |
| 6,478,088 B1 | 11/2002 | Hansen et al. |
| 6,802,375 B2 | 10/2004 | Bosma et al. |
| 6,837,316 B2 | 1/2005 | Reddy et al. |
| 6,880,642 B1 | 4/2005 | Garrett et al. |
| 7,673,686 B2 | 3/2010 | Nguyen et al. |
| 7,762,329 B1 | 7/2010 | Morgan et al. |
| 7,926,591 B2 | 4/2011 | Nguyen et al. |
| 7,956,017 B2 | 6/2011 | Gatlin et al. |
| 7,975,764 B2 | 7/2011 | Sullivan et al. |
| 8,157,009 B2 | 4/2012 | Patil et al. |
| 8,235,116 B1 | 8/2012 | Burts, Jr. et al. |

(Continued)

FOREIGN PATENT DOCUMENTS

| CA | 2709646 A1 | 7/2009 |
| CN | 101451061 A | 6/2009 |

(Continued)

OTHER PUBLICATIONS

Office Action dated Jan. 27, 2021 pertaining to U.S. Appl. No. 16/826,989, filed Mar. 23, 2020, 58 pgs.
Office Action dated Jan. 28, 2021 pertaining to U.S. Appl. No. 16/829,470, filed Mar. 25, 2020, 51 pgs.
Notice of Allowance and Fee(s) Due dated Dec. 10, 2020 pertaining to U.S. Appl. No. 16/809,892, filed Mar. 5, 2020, 14 pgs.
International Search Report and Written Opinion dated Dec. 11, 2020 pertaining to International application No. PCT/US2020/050616 filed Sep. 14, 2020, 13 pgs.

(Continued)

*Primary Examiner* — Silvana C Runyan
(74) *Attorney, Agent, or Firm* — Dinsmore & Shohl LLP

(57) ABSTRACT

A lost circulation material (LCM) composition for sealing lost circulation zones in wellbores may include 50 weight percent to 97 weight percent epoxy resin, 2 weight percent to 30 weight percent curing agent, 0.1 weight percent to 40 weight percent weighting material, and 0.1 weight percent to 20 weight percent amide accelerator. The LCM composition may have a density of greater than or equal to 1121 kilograms per cubic meter and may be capable of being injected through a drill bit of a drill string into the lost circulation zone. The amide accelerator may enable the viscosity of the LCM composition to be reduced while providing a reduced cure time. The LCM compositions are suitable for treating high-injectivity lost circulation zones.

20 Claims, No Drawings

(56) References Cited

U.S. PATENT DOCUMENTS

| | | |
|---|---|---|
| 8,273,426 B1 | 9/2012 | Laramay et al. |
| 8,307,899 B2 | 11/2012 | Brenneis et al. |
| 8,664,285 B2 | 3/2014 | Birnbrich et al. |
| 8,789,595 B2 | 7/2014 | Guerrero et al. |
| 8,857,515 B2 | 10/2014 | Weaver |
| 8,936,087 B2 | 1/2015 | Nguyen et al. |
| 8,944,164 B2 | 2/2015 | Veldman et al. |
| 8,946,130 B2 | 2/2015 | Zamora et al. |
| 9,150,775 B2 | 10/2015 | Ostvold |
| 9,321,953 B1 | 4/2016 | Ferrell, Jr. et al. |
| 9,410,066 B2 | 8/2016 | Ghassemzadeh |
| 9,701,885 B2 | 7/2017 | Husein et al. |
| 9,828,293 B2 | 11/2017 | Yadav et al. |
| 9,902,891 B2 | 2/2018 | Hundt et al. |
| 9,932,510 B2 | 4/2018 | Walker et al. |
| 10,005,930 B2 | 6/2018 | Reddy |
| 10,081,755 B2 | 9/2018 | Ballard |
| 10,138,405 B2 | 11/2018 | Kulkarni et al. |
| 10,144,858 B2 | 12/2018 | Kennedy et al. |
| 2001/0035111 A1 | 11/2001 | Gienau et al. |
| 2002/0020530 A1 | 2/2002 | Griffith et al. |
| 2006/0219405 A1 | 10/2006 | Nguyen et al. |
| 2007/0093393 A1* | 4/2007 | Navarrete ............... C09K 8/36 507/131 |
| 2007/0102156 A1 | 5/2007 | Nguyen et al. |
| 2008/0110624 A1 | 5/2008 | Nguyen et al. |
| 2008/0277117 A1 | 11/2008 | Burts, Jr. et al. |
| 2010/0326660 A1 | 12/2010 | Ballard et al. |
| 2011/0088916 A1 | 4/2011 | Heijnen |
| 2011/0203795 A1 | 8/2011 | Murphy et al. |
| 2011/0284247 A1 | 11/2011 | Zamora et al. |
| 2011/0308799 A1* | 12/2011 | Tarafdar ................. C04B 28/02 166/293 |
| 2012/0328377 A1 | 12/2012 | Brenneis et al. |
| 2013/0008654 A1 | 1/2013 | Deville et al. |
| 2013/0105162 A1 | 5/2013 | Abad et al. |
| 2013/0178590 A1 | 7/2013 | Jin et al. |
| 2013/0292116 A1 | 11/2013 | Nguyen et al. |
| 2014/0027116 A1 | 1/2014 | Suresh et al. |
| 2014/0076563 A1 | 3/2014 | Lin et al. |
| 2014/0083702 A1 | 3/2014 | Godfrey et al. |
| 2014/0367105 A1 | 12/2014 | Karcher et al. |
| 2015/0152708 A1 | 6/2015 | Smith |
| 2015/0167424 A1 | 6/2015 | Richards et al. |
| 2015/0232719 A1 | 8/2015 | Pfeil et al. |
| 2016/0046853 A1 | 2/2016 | Chatterji et al. |
| 2016/0194544 A1 | 7/2016 | Jones et al. |
| 2016/0194548 A1 | 7/2016 | Xie et al. |
| 2016/0208157 A1* | 7/2016 | Vo .......................... C09K 8/80 |
| 2016/0272875 A1* | 9/2016 | Ghumare ................ C09K 8/86 |
| 2016/0362599 A1 | 12/2016 | Wadekar et al. |
| 2017/0009122 A1 | 1/2017 | Funkhouser et al. |
| 2017/0130554 A1 | 5/2017 | Jones et al. |
| 2017/0137562 A1 | 5/2017 | Zheng et al. |
| 2017/0247607 A1 | 8/2017 | Hundt |
| 2017/0349804 A1 | 12/2017 | Kellum et al. |
| 2017/0350212 A1 | 12/2017 | Sabins et al. |
| 2018/0066489 A1 | 3/2018 | Pipchuk et al. |
| 2018/0216437 A1 | 8/2018 | Shafer |
| 2018/0346801 A1 | 12/2018 | Dandawate et al. |
| 2019/0249067 A1 | 8/2019 | Wagle et al. |
| 2020/0024503 A1 | 1/2020 | Watters et al. |
| 2021/0040376 A1 | 2/2021 | Devarapalli et al. |

FOREIGN PATENT DOCUMENTS

| | | |
|---|---|---|
| EP | 898049 A1 | 2/1999 |
| EP | 898050 A1 | 2/1999 |
| EP | 899415 A1 | 3/1999 |
| EP | 899416 A1 | 3/1999 |
| EP | 903461 A2 | 3/1999 |
| EP | 1031544 A2 | 8/2000 |
| EP | 2166028 A1 | 3/2010 |
| WO | 2014036218 A1 | 3/2014 |
| WO | 2014074112 A1 | 5/2014 |
| WO | 2014197827 A1 | 12/2014 |
| WO | 2014200889 A1 | 12/2014 |
| WO | 2015023186 A1 | 2/2015 |
| WO | 2015040241 A1 | 3/2015 |
| WO | 2016043979 A1 | 3/2016 |
| WO | 2016048303 A1 | 3/2016 |
| WO | 2016048332 A1 | 3/2016 |
| WO | 2016080974 A1 | 5/2016 |
| WO | 2016093827 A1 | 6/2016 |
| WO | 2016111674 A1 | 7/2016 |
| WO | 2017204812 A1 | 11/2017 |
| WO | 2019091900 A1 | 5/2019 |

OTHER PUBLICATIONS

Notice of Allowance and Fee(s) Due dated Dec. 30, 2020 pertaining to U.S. Appl. No. 16/809,822, filed Mar. 5, 2020, 13 pgs.

Office Action dated Jun. 24, 2020 pertaining to U.S. Appl. No. 16/117,974, filed Aug. 30, 2018, 41 pgs.

Office Action dated May 8, 2020 pertaining to U.S. Appl. No. 16/515,673, filed Jul. 18, 2019, 41 pgs.

Office Action dated Nov. 17, 2020 pertaining to U.S. Appl. No. 16/117,974, filed Aug. 30, 2018, 46 pgs.

Bhaisora et al., "Innovative Application of Ultra-Lightweight Epoxy Resin-Cement Slurry Mixture Achieved Zonal Isolation Objectives and Secured Well Integrity: Case History From Offshore Gulf of Suez", IPTC-18504-MS, 2015.

Foianini et al., "Successful Identification and Bond Assessment of Epoxy-Based Resin Cement Behind Production Casing: Integrating Cementing Technology with New Log Interpretation Methodology to Provide an Innovative Well Integrity Solution", SPWLA 55th Annual Logging Symposium, May 18-22, 2014.

Moe et al., "Anular pressure buildup: What it is and what to do about it", World Oil Deepwater Technology Supplement, Issue, p. 21-23, Aug. 2000.

Morris et al., "Resin-Based Cement Alternatives for Deepwater Well Construction", Society of Petroleum Engineers, SPE-155613-MS, 2012.

Nelson et al., "Well Cementing Fundamentals", Oilfield Review Summer, vol. 24, No. 2, pp. 59-60, 2012.

International Search Report and Written Opinion dated Mar. 15, 2019 pertaining to International application No. PCT/US2018/060282 filed Nov. 12, 2018, 13 pgs.

International Search Report and Written Opinion dated Jun. 21, 2019 pertaining to International application No. PCT/US2019/026882 filed Apr. 11, 2019, 14 pgs.

Office Action dated Sep. 17, 2019 pertaining to U.S. Appl. No. 16/117,902, filed Aug. 30, 2018, 26 pgs.

Office Action dated Sep. 30, 2019 pertaining to U.S. Appl. No. 16/117,974, filed Aug. 30, 2018, 35 pgs.

Office Action dated Nov. 13, 2019 pertaining to U.S. Appl. No. 16/515,673, filed Jul. 18, 2019, 23 pgs.

Office Action dated Nov. 18, 2019 pertaining to U.S. Appl. No. 16/117,950, filed Aug. 30, 2018, 22 pgs.

Cestari, A. R. et al., "Synthesis, characterization and hydration analysis of a novel epoxy/superplasticizer oilwell cement slurry Some mechanistic features by solution microcalorimetry" Journal of Colloid and Interface Science, Apr. 27, 2012, pp. 359-368, vol. 392.

Elyas, O. et al. "Use of Polymer Resins for Surface Annulus Isolation Enhancement" SPE-192266-MS, Society of Petroleum Engineers, Apr. 26, 2018, pp. 1-8.

Al-Yami, A. et al. "Optimum Practices to Mitigate Gas Migration Problems in Deep Gas Wells" SPE-187700-MS, Society of Petroleum Engineers, Oct. 18, 2017, pp. 1-21.

Alsaihati, Z. A. et al. "An Overview of Polymer Resin Systems Deployed for Remedial Operations in Saudi Arabia" SPE-188122-MS, Society of Petroleum Engineers, Apr. 27, 2017, pp. 1-15.

International Search Report and Written Opinion dated Nov. 7, 2019 pertaining to International application No. PCT/US2019/047846 filed Aug. 23, 2019.

(56) References Cited

OTHER PUBLICATIONS

International Search Report and Written Opinion dated Nov. 7, 2019 pertaining to International application No. PCT/US2019/047842 filed Aug. 23, 2019.
Final Rejection pertaining to U.S. Appl. No. 16/117,902 dated Jan. 17, 2020.
Office Action dated Mar. 10, 2020 pertaining to U.S. Appl. No. 16/117,974, filed Aug. 30, 2018, 39 pgs.
Notice of Allowance and Fee(s) Due dated Mar. 12, 2020 pertaining to U.S. Appl. No. 16/117,950, filed Aug. 30, 2018, 16 pgs.
Office Action dated Oct. 6, 2020 pertaining to U.S. Appl. No. 16/809,892, filed Mar. 5, 2020, 44 pgs.
Office Action dated Oct. 6, 2020 pertaining to U.S. Appl. No. 16/809,822, filed Mar. 5, 2020, 44 pgs.
International Search Report and Written Opinion dated Jul. 23, 2020 pertaining to International application No. PCT/US2020/028050 filed Apr. 14, 2020, 15 pgs.
International Search Report and Written Opinion dated Jul. 23, 2020 pertaining to International application No. PCT/US2020/028082 filed Apr. 14, 2020, 15 pgs.
Office Action dated Mar. 11, 2021 pertaining to U.S. Appl. No. 16/117,974, filed Aug. 30, 2018, 43 pgs.
Office Action dated May 7, 2021 pertaining to U.S. Appl. No. 16/117,902, filed Aug. 30, 2018, 76 pages.
Office Action dated May 25, 2021 pertaining to U.S. Appl. No. 16/829,470, filed Mar. 25, 2020, 25 pages.
Office Action dated May 21, 2021 pertaining to U.S. Appl. No. 16/826,989, filed Mar. 23, 2020, 25 pages.
International Search Report and Written Opinion dated Jun. 1, 2021 pertaining to International application No. PCT/US2021/018660 filed Feb. 19, 2021, 14 pages.
U.S. Office Action dated Sep. 7, 2021 pertaining to U.S. Appl. No. 16/117,902, filed Aug. 30, 2018, 29 pages.
U.S. Office Action dated Sep. 10, 2021 pertaining to U.S. Appl. No. 16/718,784, filed Dec. 18, 2019, 81 pages.
Notice of Allowance and Fee(s) Due dated Aug. 12, 2021 pertaining to U.S. Appl. No. 16/117,974, filed Aug. 30, 2018, 14 pages.
Notice of Allowance and Fee(s) Due dated Aug. 3, 2021 pertaining to U.S. Appl. No. 16/826,989, filed Mar. 23, 2020, 14 pages.
Notice of Allowance and Fee(s) Due dated Aug. 5, 2021 pertaining to U.S. Appl. No. 16/829,470, filed Mar. 25, 2020, 12 pages.
U.S. Office Action dated Oct. 13, 2021 pertaining to U.S. Appl. No. 16/515,673, filed Jul. 18, 2019, 64 pages.
U.S. Office Action dated Nov. 3, 2021 pertaining to U.S. Appl. No. 16/906,607, filed Jun. 19, 2020, 92 pages.
U.S. Office Action dated Feb. 3, 2022 pertaining to U.S. Appl. No. 16/718,784, filed Dec. 18, 2019, 21 pages.
U.S. Notice of Allowance and Fee(s) Due dated Feb. 9, 2022 pertaining to U.S. Appl. No. 16/117,902, filed Aug. 30, 2018, 15 pages.
U.S. Office Action dated Feb. 14, 2022 pertaining to U.S. Appl. No. 16/515,673, filed Jul. 18, 2019, 22 pages.
U.S. Notice of Allowance and Fee(s) Due dated Mar. 4, 2022 pertaining to U.S. Appl. No. 16/906,607 filed Jun. 19, 2020, 9 pages.

* cited by examiner

LCM COMPOSITION WITH CONTROLLED VISCOSITY AND CURE TIME AND METHODS OF TREATING A LOST CIRCULATION ZONE OF A WELLBORE

TECHNICAL FIELD

Embodiments of the present disclosure generally relate to natural resource well drilling and, more specifically, to compositions and methods for treating a lost circulation zone of a wellbore.

BACKGROUND

Extracting subterranean hydrocarbon sources may require drilling a hole from the surface to the subterranean geological formation housing the hydrocarbons. Specialized drilling techniques and materials are utilized to form the wellbore hole and extract the hydrocarbons. Specialized materials utilized in drilling operations include drilling fluids and materials for sealing the casing-casing annulus of the wellbore, which may be formulated for specific downhole conditions. A wellbore is a hole that extends from the surface to a location below the surface to permit access to hydrocarbon-bearing subterranean formations. The wellbore contains at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore. The fluid conduit may be defined by one or more tubular strings, such as casings, inserted into the wellbore and secured in the wellbore.

During drilling of a wellbore, cementing the wellbore, or both, lost circulation zones may be encountered and may result in loss of drilling fluid or cementing compositions. In a lost circulation zone, the drilling fluids, cement compositions, or other fluids flow out of the wellbore and into the surrounding formation. Lost circulation zones may result in increased cost of the well through increased material costs to replace lost fluids and downtime to remediate the lost circulation zone. Lost circulation zones may be remediated by introducing a lost circulation material into the lost circulation zone to seal off the lost circulation zone to prevent further fluid loss. Conventional lost circulation materials (LCM) can include bridging material, fibrous material, flaky material, cement such as reduced-cure-time cement, and other materials having different particle sizes.

SUMMARY

An ongoing need exists for lost circulation materials for treating lost circulation zones. Conventional lost circulation materials (LCM), such as bridging materials, fibrous materials, flaky materials, cements such as reduced-cure-time cements or other conventional lost circulation materials may be able to remediate many lost circulation zones. However, the particle sizes and viscosities of these conventional lost circulation materials may inhibit the ability to inject these materials through the drill bit and into the lost circulation zone. Instead, the conventional lost circulation materials often require that the drill bit be replaced by an open-ended pipe before these conventional lost circulation materials can be injected into the lost circulation zone. Pulling the drill string out of the wellbore to the surface to replace the drill bit with an open-ended pipe or other injection device and reinstalling the drill string back in the wellbore may cause delays in drilling. After treating the lost circulation zone and before drilling can re-commence, the drill string must be pulled out of the wellbore again and the drill bit re-installed on the end of the drill string, which can lead to further delays.

Additionally, during subsequent drilling of the wellbore and hydrocarbon production using the well, conventional cement compositions used to isolate lost circulation zones may be subjected to temperature and pressure cycling. This temperature and pressure cycling may cause micro-cracks to form in the cements that are conventionally used to remediate lost circulation zones. Fluids, such as gas or liquids, may migrate through these micro-cracks, eventually resulting in additional loss of fluids to the lost circulation zone.

Accordingly, needs exist for lost circulation material (LCM) compositions for high-injectivity lost circulation zones that are injectable through the drill bit of the drill string to remediate lost circulation zones without pulling the drill string to replace the drill bit with an open-ended pipe or other injection device. There is also a need for LCM compositions that are more resistant to formation of microcracks caused by thermal and pressure cycling of the wellbore.

These needs are met by embodiments of the LCM compositions of the present disclosure. The LCM compositions of the present disclosure may include an epoxy resin system, a weighting material, and an amide accelerator having at least one amide functional group. The epoxy resin system may include at least one epoxy resin and at least one curing agent The LCM compositions of the present disclosure may be suitable for treating high-injectivity lost circulation zones. The presence of the amide accelerator may enable the LCM compositions to have controllable viscosity and cure time so that the LCM compositions can be injected into the lost circulation zone through the drill bit and still have a sufficiently short cure time, such as a cure time of less than 8 hours, to treat a high-injectivity lost circulation zone without being lost to the formation. Thus, the LCM compositions of the present disclosure may have a reduced cure time while still having an initial dynamic viscosity that enables the LCM composition to be dispensed through the drill bit. The controllable viscosity and controllable cure time of the LCM compositions of the present disclosure may reduce the downtime of drilling operations resulting from lost circulation zones compared to using conventional LCMs.

Additionally, the epoxy-based LCM compositions may be more resistant to formation of microcracks caused by thermal and pressure cycling of the wellbore compared to conventional LCMs. Once cured, the LCM compositions that include the epoxy resin system may form a barrier to prevent drilling fluids at a pressure greater than the formation pressure from flowing out of the wellbore and into the formation. The LCM compositions may exhibit greater compressive strength, reduced density, and greater elasticity compared to conventional cement compositions, which may enable the LCM compositions to resist degradation, such as formation of micro-cracks, caused by temperature and pressure cycling during production. As a result, the LCM composition may reduce or prevent penetration of drilling fluids into the formation. The LCM compositions may be more resistant to corrosive fluids than conventional cements and other materials used for lost circulation zone remediation. The LCM compositions that include the epoxy resin system can withstand greater pressures than conventional cements and may improve the zonal isolation and mitigate gas migration through the LCM composition compared to the conventional cements. For example, the LCM compositions that include the epoxy resin system can withstand pressures in a range of from 7,000 pounds per square inch (psi) (48,263 kilopascals (kPa)) to 15,000 psi (103,421 kPa) that are greater than conventional cement compositions, which can only withstand pressures in a range of from 500 psi (3447 kPa) to 5,000 psi (34,473 kPa). This ability of the LCM compositions with the epoxy resin system to withstand greater pressures may enable the LCM compositions to be injected a further distance into high-pressure formations compared to conventional cement compositions.

According to one or more aspects of the present disclosure, a lost circulation material (LCM) composition for sealing lost circulation zones in wellbores may include 20 weight percent to 97 weight percent epoxy resin, 2 weight percent to 30 weight percent curing agent, 0.1 weight percent to 70 weight percent weighting material, and 0.1 weight percent to 20 weight percent amide accelerator based on the total weight of the LCM composition. The LCM composition may have a density of greater than or equal to 1121 kilograms per cubic meter and may be capable of being injected through a drill bit of a drill string into the lost circulation zone.

According to one or more other aspects of the present disclosure, a method of treating a lost circulation zone of a wellbore may include introducing a lost circulation material (LCM) composition into the lost circulation zone. The LCM composition may include 20 weight percent to 97 weight percent epoxy resin, 2 weight percent to 30 weight percent curing agent, 0.1 weight percent to 70 weight percent weighting material, and 0.1 weight percent to 20 weight percent amide accelerator based on the total weight of the LCM composition. The LCM composition may have a density of greater than or equal to 1121 kilograms per cubic meter. Introducing the LCM composition into the lost circulation zone may include injecting the LCM composition through a drill bit of a drill string. The method may further include curing the LCM composition in the lost circulation zone to produce a barrier operable to prevent wellbore fluids from passing into the lost circulation zone.

Additional features and advantages of the described embodiments will be set forth in the detailed description, which follows, and in part will be readily apparent to those skilled in the art from that description or recognized by practicing the described embodiments, including the detailed description, which follows, as well as the claims.

DETAILED DESCRIPTION

Embodiments of the present disclosure are directed to LCM compositions having controlled viscosity and cure time and methods of remediating lost circulation zones using the LCM compositions. The LCM compositions of the present disclosure for sealing lost circulation zones in wellbores may include an epoxy resin, a curing agent operable to cure the epoxy resin, a weighting material, and an amide accelerator that includes at least one amide functional group. The LCM compositions may have a density of greater than or equal to 1121 kilograms per cubic meter (kg/m$^3$) (equivalent to 70 pounds per cubic foot (lb/ft$^3$), where 1 lb/ft$^3$=16.02 kg/m$^3$) and may be capable of being injected through a drill bit of a drill string into the lost circulation zone.

As used throughout this disclosure, the term "hydrocarbon-bearing formation" refers to a subterranean geologic region containing hydrocarbons, such as crude oil, hydrocarbon gases, or both, which may be extracted from the subterranean geologic region.

As used throughout this disclosure, the term "fluid" may include liquids, gases, or both. As used throughout the disclosure, "spacer fluid" refers to a fluid utilized to space apart any two other materials utilized in well production.

As used throughout this disclosure, the terms "uphole" and "downhole" may refer to a position within a wellbore relative to the surface, with "uphole" indicating direction or position closer to the surface and "downhole" referring to direction or position farther away from the surface.

As used throughout this disclosure, the term "high-injectivity zone" may refer to a lost circulation zone having an injectivity factor of less than or equal to 4000 pounds of force per square inch*min per barrel (psi*min/bbl), or even less than or equal to 3000 psi*min/bbl. As used in this disclosure, the term "barrel" refers to a unit of measure equal to 42 United States (U.S.) Gallons. The injectivity factor is defined as the quotient of the injection pressure in pounds of force per square inch (psi) divided by the injection rate in barrels per minute (bbl/min).

As used throughout this disclosure, the term "cure" or "curing," when used in the context of the epoxy resin systems, may refer to the process of cross-linking the epoxy resin, which is in a liquid form initially, with a curing agent to form a semi-solid or solid cured epoxy.

As used throughout this disclosure, the term "cure time," when used in the context of the epoxy resin system, may refer to a time duration between a first time at which a curing agent is added to the epoxy resins and a second time at which the epoxy resin system has cured to form at least a semi-solid epoxy.

As used in this disclosure, the term "semi-solid" may refer to a state of the compositions that is between a liquid and a solid and in which the composition exhibits greater elasticity and flexibility compared to a composition cured all the way to a rigid solid. In the semi-solid state, the LCM composition may be easily deformed but may return to shape upon releasing the deforming force.

The wellbore forms a pathway capable of permitting both fluids and apparatus to traverse between the surface and the hydrocarbon-bearing formation. Besides defining the void volume of the wellbore, the wellbore wall also acts as the interface through which fluid can transition between the subterranean formation and the interior of the well bore. The wellbore wall can be unlined (that is, bare rock or formation) to permit such interaction with the formation or lined, such as by a tubular string, so as to prevent such interactions.

The wellbore may include at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore. Example equipment connected at the surface to the fluid conduit includes pipelines, tanks, pumps, compressors, and flares. The fluid conduit may be large enough to permit introduction and removal of mechanical devices, including but not limited to tools, drill strings, sensors, and instruments, into and out of the interior of the well bore.

The wellbore may be drilled using a drill string in the presence of a drilling fluid. The drill string may include a drill bit coupled to the downhole end of the drill string. While drilling the wellbore, the drilling operation may encounter a lost circulation zone. When a lost circulation zone is encountered during drilling, fluids in the wellbore flow from the wellbore into the subterranean formation, resulting in loss of these fluids. These fluids can include but are not limited to drilling fluids, sealing compositions, spacer fluids, wash fluids, preflush fluids, or displacement fluids. In some instances, lost circulation may be caused by the natural state of the subterranean formation through which the drilling passes. For example, the subterranean formation may be naturally fractured or may be an unconsolidated formation, such as but not limited to gravel, sand, pea, or combinations of these. Alternatively, in other circumstances, the hydrostatic pressure of the fluids in the wellbore may be greater than the fracture gradient of the subterranean formation, which may cause at least some breakdown of the pores in the formation. If the pores in the formation breakdown, then the pores may become large enough to reduce the resistance to flow of fluids into the pores, which may result in the formation receiving fluids from the wellbore instead of resisting the flow of these fluids into the formation.

Lost circulation zones may be remediated by introducing a material into the subterranean formation in the lost circulation zone to seal the lost circulation zone from the wellbore by blocking flow pathways in the subterranean formation and preventing flow of fluids from the wellbore into the subterranean formation. The material may be injected into the lost circulation zone or squeezed into the lost circulation zone. Conventional lost circulation materials (LCM) can include bridging material, fibrous material, flaky material, cement such as low-cure-time cement, or any other materials having different particle sizes. Specific examples of conventional lost circulation materials may include but are not limited to cements, paper, cottonseed hulls, nutshells, or combinations of these. These materials may be able to remediate many lost circulation zones by forming a layer of solids over the formation at the lost circulation zone. However, as previously discussed, these materials may require removal of the drill string and drill bit from the wellbore and replacement with an open-ended pipe or other injection device.

In some applications, such as for treatment of low-injectivity lost circulation zones, LCMs that are substantially free of solids have been developed. As used in this disclosure, the term "substantially free" of a constituent means less than 1 weight percent (wt. %) of that component in a particular portion of a composition, such as but not limited to drilling fluids, sealing compositions, lost circulation materials, spacer fluids, displacement fluids, or cleaning fluids. As an example, a lost circulation material that is substantially free of solids may have less than 1 wt. % solids based on the total weight of the lost circulation material. Low-injectivity lost circulation zones are lost circulation zones in which it is generally not possible to inject materials containing solid particles. Low-injectivity zones may include zones having an injectivity factor of greater than 4000 pounds of force per square inch*min per barrel (psi*min/bbl), or even greater than 6000 psi*min/bbl. These low-injectivity zones may include, but are not limited to, tight fractures comprising narrow microcracks from the wellbore into the subterranean formation and areas in which the annular distance between casings is tight. The solids-free LCMs may be capable of being injected through the drill string into the formation for treating low-injectivity lost circulation zones.

However, these solids-free LCMs may be unsuitable for treating high-injectivity lost circulation zones due to the lack of solids and lesser density compared to the conventional lost circulation materials that include solids. As previously described in this disclosure, high-injectivity zones may be characterized by having an injectivity factor of less than or equal to 4000 psi*min/bbl, or even less than or equal to 3000 psi*min/bbl. In other words, high-injectivity lost circulation zones may have less resistance to flow of fluids into the formation compared to low-injectivity lost circulation zones. When a high-injectivity lost circulation zone is encountered, pumping fluids downhole may result in no fluids returned back to the surface. High-injectivity lost circulation zones may have greater porosity, such as greater pore size, greater size of microcracks, or greater pore density compared to low-injectivity zones. The greater porosity of the high-injectivity lost circulation zones may reduce the resistance to flow into the formation. In some embodiments, high-injectivity lost circulation zones may have an average microcrack width of greater than 100 microns. The solids-free LCMs, which have lesser density and no solids compared to conventional LCMs, may flow readily into the high-injectivity lost circulation zone at flow rates great enough to cause the solids-free LCMs to be lost to the formation before the solids-free LCMs can cure and block the pores. These solids-free LCMs may not have a cure time fast enough to build viscosity through curing before being lost to the lost circulation zone.

As previously discussed, embodiments of the present disclosure are directed to LCM compositions having controlled viscosity and cure time and methods of remediating lost circulation zones using the LCM compositions. The LCM compositions of the present disclosure for sealing lost circulation zones in wellbores may include an epoxy resin, a curing agent operable to cure the epoxy resin, a weighting material, and an amide accelerator that includes at least one amide functional group. The LCM compositions may have a density of greater than or equal to 1121 kilograms per cubic meter ($kg/m^3$) and may be capable of being injected through a drill bit of a drill string into the lost circulation zone.

The LCM compositions of the present disclosure may be suitable for treating high-injectivity lost circulation zones. The presence of the amide accelerator may enable the LCM compositions to have controllable viscosity and cure time so that the LCM compositions can be injected into the lost circulation zone through the drill bit and still have a sufficiently short cure time, such as a cure time of less than 8 hours, less than or equal to 6 hours, or even less than or equal to 4 hours, to treat a high-injectivity lost circulation zone without being lost to the formation. Thus, the LCM compositions of the present disclosure may have a reduced cure time while still having an initial dynamic viscosity that enables the LCM composition to be dispensed through the drill bit. The controllable viscosity and controllable cure time of the LCM compositions of the present disclosure may reduce the downtime of drilling operations resulting from lost circulation zones.

Additionally, the epoxy-based LCM compositions may be more resistant to formation of microcracks caused by thermal and pressure cycling of the wellbore compared to conventional cements. Once cured, the LCM compositions that include the epoxy resin system may form a barrier to prevent drilling fluids at a pressure greater than the formation pressure from flowing out of the wellbore and into the formation. The LCM compositions may exhibit greater compressive strength, reduced density, and greater elasticity compared to conventional cement compositions, which may enable the LCM compositions to resist degradation, such as formation of micro-cracks, caused by temperature and pressure cycling during production. As a result, the LCM composition may reduce or prevent penetration of drilling fluids into the formation. The LCM compositions may be more resistive to corrosive fluids than conventional cements and other materials used for lost circulation zone remediation. The LCM compositions that include the epoxy resin system can withstand greater pressures than conventional cements and may improve the zonal isolation and mitigate gas migration through the LCM composition compared to the conventional cements. For example, the LCM compositions that include the epoxy resin system can withstand pressures in a range of from 7,000 pounds per square inch (psi) (48,263 kilopascals (kPa)) to 15,000 psi (103,421 kPa) that are greater than conventional cement compositions, which can only withstand pressures in a range of from 500 psi (3447 kPa) to 5,000 psi (34,473 kPa). This ability of the LCM compositions with the epoxy resin system to withstand greater pressures may enable the LCM compositions to be injected deeper into high-pressure formations compared to conventional cement compositions.

As previously discussed in this disclosure, LCM compositions of the present disclosure may include an epoxy resin system that includes at least one epoxy resin and at least one curing agent. As used in this disclosure, the term "epoxy resin system" may refer to the constituents that react to form the cured epoxy and may include but are not limited to the epoxy resins, reactive and non-reactive diluents, and curing agents. The "epoxy resin system" may generally exclude weighting materials, emulsifiers, and components and additives that do not participate in the polymerization reaction of the epoxy system. In the present disclosure, the amide accelerators are treated as separate constituents of the LCM compositions but may be considered part of the epoxy resin system in some embodiments.

The epoxy resin may include bisphenol-A-based epoxy resins, bisphenol-F-based epoxy resins, aliphatic epoxy resins, aromatic epoxy resins, Novalac resins, or combinations of these epoxy resins. Aliphatic and aromatic epoxy resins may include glycidyl ethers and diglycidyl ethers. Glycidyl ethers may include alkyl glycidyl ethers, aromatic glycidyl ethers, or both. Glycidyl ethers may have chemical formula (I):

$$R^1—O—CH_2—(C_2H_3O) \quad (I)$$

where $R^1$ may be a linear, branched, cyclic, or aromatic hydrocarbyl having from 4 to 24 carbon atoms, such as from 4 to 20, from 4 to 16, from 4 to 12, from 4 to 8, from 6 to 24, from 6 to 20, from 6 to 16, from 6 to 12, or from 12 to 14 carbon atoms. In some embodiments, $R^1$ may be a branched, linear, or cyclic alkyl. In some embodiments, $R^1$ may include one or more substituted or unsubstituted aromatic rings. In some embodiments, the epoxy resin may include C12-C14 alkyl glycidyl ethers, butyl glycidyl ether, 2,3-epoxypropyl-o-tolyl ether, or combinations of these. Diglycidyl ethers may have chemical formula (II):

$$(OC_2H_3)—CH_2—O—R^2—O—CH_2—(C_2H_3O) \quad (II)$$

where $R^2$ may be a linear, branched, cyclic, or aromatic hydrocarbyl having from 4 to 24 carbon atoms, such as from 4 to 20, from 4 to 16, from 4 to 12, from 4 to 8, from 6 to 24, from 6 to 20, from 6 to 16, from 6 to 12, or from 12 to 14 carbon atoms. In some embodiments, $R^2$ may include one or more substituted or unsubstituted aromatic rings. In some embodiments, $R^2$ may be an alkyl group or cycloaklyl group. For example, in some embodiments, the epoxy resin may include 1,6-hexanediol diglycidyl ether, which has chemical formula (III):

$$(OC_2H_3)—CH_2—O—C_6H_{12}—O—CH_2—(C_2H_3O) \quad (III)$$

In some embodiments, the epoxy resin may include cyclohexanedimethanol digylcidyl ether, which has chemical formula (IV):

$$(OC_2H_3)—CH_2—O—CH_2—(C_6H_{10})—CH_2—O—CH_2—(C_2H_3O) \quad (IV)$$

In some embodiments, the epoxy resin in the LCM composition may include at least one of a bisphenol-A-epichlorohydrin epoxy resin, an alkyl glycidyl ether, an alkyl diglycidyl ether, an aromatic glycidyl ether, or combinations of these. In some embodiments, the epoxy resin in the LCM composition may include at least one of 1,6-hexanediol diclycidyl ether, alkyl glycidyl ethers having from 12 to 14 carbon atoms, butyl glycidyl ether, 2,3-epoxypropyl o-tolyl ether, cyclohexanedimethanol diclycidyl ether, bisphenol-A-epichlorohydrin epoxy resin, or combinations of these. In some embodiments, the epoxy resin of the LCM composition may include at least one of 1,6-hexanediol diclycidyl ether, alkyl glycidyl ethers having from 12 to 14 carbon atoms, 2,3-epoxypropyl o-tolyl ether, butyl glycidyl ether, cyclohexanedimethanol diglycidyl ether, or combinations of these.

The epoxy resin may have an epoxy value of from 4.5 epoxy equivalents per kilogram of the epoxy resin to 5.5 epoxy equivalents per kilogram of the epoxy resin. The epoxy equivalent weight of an epoxy resin is the weight of the epoxy resin in grams that contains one equivalent weight of epoxy. The epoxy equivalent weight of the epoxy resin is equal to the molecular weight of the epoxy resin divided by the average number of epoxy groups in the epoxy resin. The epoxy resins may have an epoxy equivalent weight of from 170 to 350 grams of resin per epoxy equivalent (g/eq). The epoxy value and epoxy equivalent weight of an epoxy resin may be determined according to ASTM-D1652. Other methods of determining the epoxy value and epoxy equivalent weight of the epoxy resin may also be used to determine the epoxy value or epoxy equivalent weight of the epoxy resin.

In some embodiments, the epoxy resin may be modified with a reactive diluent. The type and amount of reactive diluent may influence the viscosity, flexibility, hardness, chemical resistance, mechanical properties, plasticizing effect, reactivity, crosslinking density, or other properties of the epoxy resin. In some embodiments, the reactive diluent may be added to the epoxy resin to change the viscosity of the epoxy resin, such as to reduce the viscosity of the epoxy resin. In other embodiments, the reactive diluents may be added to improve at least one of the adhesion, the flexibility, and the solvent resistance of the epoxy resin. The reactive diluent can be a non-functional, mono-functional, di-functional, or multi-functional reactive diluent. For example, a non-functional reactive diluent does not have an epoxide functional group. As used in relation to reactive diluents, the term "functional" refers to the reactive diluent having at least one epoxide functional group. A functional reactive diluent may have one, two, three, or more than three epoxide functional groups. The term "non-functional", as used in relation to reactive diluents, refers to a reactive diluent that does not have at least one epoxide functional group. Thus, a non-functional reactive diluent does not have at least one epoxide functional group, but still participates in at least one chemical reaction during reaction of the epoxide resin. The term "non-reactive diluent" refers to a diluent that does not participate in a chemical reaction during reaction of the epoxy resin. Examples of reactive and non-reactive diluents may include, but are not limited to, propylene glycol diglycidyl ether, butanediol diglycidyl ether, cardanol glycidyl ether derivatives, propanetriol triglycidyl ether, aliphatic monoglycidyl ethers of $C_{13}$-$C_{15}$ alcohols, or combinations of functional or non-functional reactive diluents and non-reactive diluents. In some embodiments, the epoxy resin may include a reactive diluent having the formula (V):

$$R^3—O—CH_2—(C_2H_3O) \quad (V)$$

where $R^3$ may be a linear or branched hydrocarbyl having from 12 to 14 carbon atoms. $R^3$ may be linear, branched, or cyclic. In some embodiments, $R^3$ may be an alkyl group.

The epoxy resin in the LCM composition may include an amount of reactive diluent that modifies one or more of the viscosity, adhesion, the flexibility, or the solvent resistance of the epoxy resin. In some embodiments, the epoxy resin may include from 1 wt. % to 30 wt. % reactive diluent based on the total weight of the epoxy resin portion of the epoxy resin system. As used in this disclosure, the term "epoxy resin portion" refers to the constituents of the epoxy resin system that do not include the curing agents, accelerators, retarders, and additives of the epoxy resin system. The epoxy resin portion includes the epoxy resins and any added reactive or non-reactive diluent. In some embodiments, the epoxy resin may include from 1 wt. % to 20 wt. %, from 1 wt. % to 16 wt. %, from 1 wt. % to 14 wt. %, from 1 wt. % to 12 wt. %, from 5 wt. % to 30 wt. %, from 5 wt. % to 20 wt. %, from 5 wt. % to 16 wt. %, from 5 wt. % to 14 wt. %, from 5 wt. % to 12 wt. %, from 10 wt. % to 30 wt. %, from 10 wt. % to 20 wt. %, from 10 wt. % to 16 wt. %, from 10 wt. % to 14 wt. %, from 12 wt. % to 30 wt. %, from 12 wt. % to 20 wt. %, from 12 wt. % to 16 wt. %, from 14 wt. % to 30 wt. %, from 14 wt. % to 20 wt. %, or from 14 wt. % to 16 wt. % reactive diluent based on the total weight of the epoxy resin portion of the epoxy resin system.

In some embodiments, the epoxy resin may include bisphenol-A-(epichlorohydrin) epoxy resin with oxirane mono [($C_{12}$-$C_{14}$)-alkyloxy)methyl] derivatives. The bisphenol-A-epichlorohydrin epoxy resin is an epoxy resin made by reaction of bisphenol-A and epichlorohydrin. The bisphenol-A-(epichlorohydrin) epoxy resin may then be modified with the reactive diluent oxirane mono [($C_{12}$-$C_{14}$)-alkyloxy) methyl] derivatives to reduce the viscosity of the resin and improve the adhesion, flexibility, and solvent resistance of the final cured epoxy. The bisphenol-A-(epichlorohydrin) epoxy resin with the reactive diluent oxirane mono [($C_{12}$-$C_{14}$)-alkyloxy) methyl] derivatives may modify the viscosity of LCM compositions, or may provide the LCM compositions with a non-crystalizing resin and improved mechanical and chemical resistance compared to compositions without the bisphenol-A-(epichlorohydrin) epoxy resin with the reactive diluent oxirane mono [($C_{12}$-$C_{14}$)-alkyloxy) methyl] derivatives. In some embodiments, the epoxy resin portion may include from 70 wt. % to 90 wt. %, from 70 wt. % to 88 wt. %, from 70 wt. % to 86 wt. %, from 70 wt. % to 84 wt. %, from 80 wt. % to 90 wt. %, from 80 wt. % to 88 wt. %, from 80 wt. % to 86 wt. %, from 80 wt. % to 84 wt. %, from 84 wt. % to 90 wt. %, from 84 wt. % to 88 wt. %, or from 84 wt. % to 86 wt. % of the bisphenyl-A-epichlorohydrin epoxy resin based on the total weight of the epoxy resin portion of the epoxy resin system. In some embodiments, the epoxy resin may include from 10 wt. % to 30 wt. %, from 10 wt. % to 20 wt. %, from 10 wt. % to 16 wt. %, from 10 wt. % to 14 wt. %, from 12 wt. % to 30 wt. %, from 12 wt. % to 20 wt. %, from 12 wt. % to 16 wt. %, from 12 wt. % to 14 wt. %, from 14 wt. % to 30 wt. %, from 14 wt. % to 20 wt. %, or from 14 wt. % to 16 wt. % oxirane mono[($C_{12}$-$C_{14}$)-alkyloxy)methyl] derivatives based on the total weight of the epoxy resin portion of the epoxy resin system.

In some embodiments, the epoxy resin comprising the bisphenol-A-(epichlorohydrin) epoxy resin with the reactive diluent oxirane mono [($C_{12}$-$C_{14}$)-alkyloxy) methyl] derivatives may have an epoxy value of from 4.76 epoxy equivalents per kilogram of epoxy resin to 5.26 epoxy equivalents per kilogram of epoxy resin. The epoxy resin comprising the bisphenol-A-(epichlorohydrin) epoxy resin with the reactive diluent oxirane mono [($C_{12}$-$C_{14}$)-alkyloxy) methyl] derivatives may have an epoxy equivalent weight of 190 g/eq to 210 g/eq and a dynamic viscosity of from 600 millipascal seconds (mPa*s) to 1200 mPa*s, or 600 mPa*s to 900 mPa*s.

The epoxy resin may include 2,3-epoxypropyl-o-tolyl ether, which may have an epoxy equivalent weight of from 170 g/eq to 190 g/eq and exhibit a dynamic viscosity of from 7 mPa*s to 10 mPa*s. In other embodiments, the epoxy resin may include alkyl glycidyl ethers having from 12 to 14 carbon atoms, which may have an epoxy equivalent weight of from 270 g/eq to 305 g/eq and may exhibit a dynamic viscosity of from 5 mPa*s to 12 mPa*s. In some embodiments, the epoxy resin may include 1,6-hexanediol diclycidyl ether, which may have an epoxy equivalent weight of from 150 g/eq to 170 g/eq and may exhibit a dynamic viscosity of from 20 mPa*s to 30 mPa*s. In some embodiments, the epoxy resin may include cyclohexanedimethanol diglycidyl ether, which may have an epoxy equivalent weight of from 125 g/eq to 145 g/eq and may exhibit a dynamic viscosity of from 50 mPa*s to 70 mPa*s. In some embodiments, the epoxy resin may include butyl glycidyl ether, which may have an epoxy equivalent weight of from 120 g/eq to 140 g/eq and may exhibit a dynamic viscosity of from 400 mPa*s to 500 mPa*s.

The epoxy resin system of the LCM composition may include a plurality of epoxy resins. For example, in some embodiments, the epoxy resin system of the LCM composition may include a combination of two or more of bisphenol-A-based epoxy resins, bisphenol-F-based epoxy resins, aliphatic epoxy resins, aromatic epoxy resins, Novalac resins, or combinations of these epoxy resins. In some embodiments, the epoxy resin system in the LCM composition may include two or more of 1,6-hexanediol diclycidyl ether, alkyl glycidyl ethers having from 12 to 14 carbon atoms, butyl glycidyl ether, 2,3-epoxypropyl o-tolyl ether, cyclohexanedimethanol diclycidyl ether, bisphenol-A-epichlorohydrin epoxy resin, or combinations of these. In some embodiments, the epoxy resin system in the LCM composition may include bisphenol-A-epichlorohydrin epoxy resin and butyl glycidyl ether. In some embodiments, the epoxy resin in the LCM composition may include bisphenol-A-epichlorohydrin epoxy resin, butyl glycidyl ether, and cyclohexanedimethanol diglycidyl ether.

The LCM compositions may include an amount of the epoxy resin necessary to form a cured epoxy composition. For example, in some embodiments, the LCM compositions may include from 20 wt. % to 97 wt. % epoxy resin based on the total weight of the LCM composition before curing. In some embodiments, the LCM composition may include from 20 wt. % to 95 wt. %, from 20 wt. % to 90 wt. %, from 20 wt. % to 80 wt. %, from 20 wt. % to 60 wt. %, from 40 wt. % to 97 wt. %, from 40 wt. % to 95 wt. %, from 40 wt. % to 90 wt. %, from 40 wt. % to 80 wt. %, from 40 wt. % to 60 wt. %, from 50 wt. % to 97 wt. %, from 50 wt. % to 95 wt. %, from 50 wt. % to 90 wt. %, from 50 wt. % to 80 wt. %, from 60 wt. % to 97 wt. %, from 60 wt. % to 95 wt. %, from 60 wt. % to 90 wt. %, from 80 wt. % to 97 wt. %, from 80 wt. % to 95 wt. %, or from 80 wt. % to 90 wt. % epoxy resin based on the total weight of the LCM composition before curing.

As previously discussed in this disclosure, the epoxy resin system includes a curing agent to cure the epoxy resin. The curing agent may include at least one amine group. For example, the curing agents with amine functional groups may include, but are not limited to, at least one of an amine, polyamine, amine adduct, polyamine adduct, alkanolamine, phenalkamines, or combinations of these. Amine or polyamine curing agents may include, but are not limited to, aliphatic amines, cycloaliphatic amines, modified cycloaliphatic amines such as cycloaliphatic amines modified by polyacrylic acid, aliphatic polyamines, cycloaliphatic polyamines, modified polyamines such as polyamines modified by polyacrylic acid, or amine adducts such as cycloaliphatic amine adducts or polyamine adducts.

In some embodiments, the curing agent may include at least one of trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), diethyltoluenediamine (DETDA), polyoxypropylene diamine, or combinations of these. In some embodiments, the curing agent may include at least one of DETA, DETDA, polyoxypropylene diamine, or combinations of these. The epoxy resin system in the LCM composition may include a plurality of curing agents.

The curing agent may be an amine curing agent having an amine value that enables the amine curing agent to fully cure the epoxy resin system. The amine value of a curing agent gives the active hydrogen (NH) content of an amine curing agent. The amine value is expressed as the weight in milligrams of potassium hydroxide (KOH) needed to neutralize the NH in 1 gram of the amine curing agent. In some embodiments, the curing agent may have an amine value of from 250 milligrams of KOH per gram (mg KOH/g) to 1700 mg KOH/g, from 250 mg KOH/g to 1650 mg KOH/g, from 250 mg KOH/g to 1600 mg KOH/g, from 450 mg KOH/g to 1700 mg KOH/g, from 450 mg KOH/g to 1650 mg KOH/g, from 450 mg KOH/g to 1600 mg KOH/g, from 650 mg KOH/g to 1700 mg KOH/g, from 650 mg KOH/g to 1650 mg KOH/g, or from 650 mg KOH/g to 1600 mg KOH/g. The amine value may be determined by titrating a solution of the curing agent with a dilute acid, such as a 1 N solution of hydrogen chloride (HCl). The amine value may then be calculated from the amount of HCl needed to neutralize the amine in the solution according to Equation 1 (EQU. 1):

$$\frac{V_{HCl} * N_{HCl} * MW_{KOH}}{W} \quad \text{EQU. 1}$$

where $V_{HCl}$ is the volume in milliliters of HCl needed to neutralize the amine, $N_{HCl}$ is the normality of HCl used to titrate the amine, $MW_{KOH}$ is the molecular weight of KOH in grams per mole, and W is the weight in grams of the curing agent sample titrated. The amine number of the known pure amine curing agent may be calculated from Equation 2 (EQU. 2):

$$\frac{1000 * MW_{KOH}}{MW_{curing\ agent}} \quad \text{EQU. 2}$$

where $MW_{KOH}$ is the molecular weight of KOH in grams per mole, and $MW_{curing\ agent}$ is the molecular weight of the curing agent in grams per mole.

The amine curing agent may have an amine hydrogen equivalent weight (AHEW) that enables the amine curing agent to fully cure the epoxy resin system. The AHEW of an amine curing agent refers to the grams of the amine curing agent containing 1 equivalent of amine. The AHEW of an amine curing agent may be calculated by dividing the molecular weight of the amine curing agent in grams per mole by the number of active hydrogens per molecule. In some embodiments, the curing agent may be an amine curing agent having an AHEW of from 20 grams (g) to 120 g, from 20 g to 115 g, from 20 g to 110 g, from 20 g to 100 g, from 40 g to 120 g, from 40 g to 115 g, from 40 g to 110 g, from 40 g to 110 g, from 60 g to 120 g, from 60 g to 115 g, or from 60 g to 110 g determined according to the methods previously described in this disclosure.

The epoxy resins in the epoxy resin system may be in liquid form initially. Upon combining the epoxy resins with the curing agents to form the epoxy resin system, the epoxy resins react with the curing agents to transform into a semi-solid or solid epoxy resin. Transition of the epoxy resin system from a liquid to a solid involves formation of covalent bonds via cross-linking reactions that initially build viscosity in the epoxy resin system. Thus, during the curing process in which the epoxy resin system transforms from liquid to solid through cross-linking, the buildup of viscosity in the LCM compositions may enable the LCM compositions to continue to transmit hydrostatic pressure to the hydrocarbon-bearing formation. At a crossover point in the curing process, the epoxy resin system may begin to form into a non-porous three-dimensional network. As this non-porous three-dimensional network begins to form, the epoxy resin system continues to transmit hydrostatic pressure to the formation until an impermeable barrier of cured epoxy polymer forms within the pores of the formation. This impermeable barrier formed by the cured epoxy polymer of the LCM composition may remediate the lost circulation zone by preventing the flow of liquids from the wellbore into the lost circulation zone.

The epoxy resin system may have a cure time that enables the LCM composition to be transferred into the lost circulation zone in the formation before the buildup of viscosity during curing causes transfer problems, such as inability to pump the LCM composition.

The curing time of the epoxy resin system may be inversely proportional to the amount of curing agent in the epoxy resin system. For example, increasing the amount of the curing agent in the epoxy resin system may decrease the curing time of the epoxy resin system. The epoxy resin system may include an amount of curing agent capable of curing the epoxy resin system to a semi-solid state in a cure time of less than or equal to 24 hours, less than or equal to 12 hours, or even less than or equal to 8 hours. As described previously in this disclosure, the term "semi-solid" refers to a state of the epoxy resin system that is between a liquid and a solid and in which the cured epoxy polymers exhibit greater elasticity and flexibility compared to an epoxy resin cured all the way to a rigid solid. In the semi-solid state, the LCM compositions containing the epoxy resin systems may be easily deformed but may return to shape upon releasing the deforming force. The LCM compositions that include the epoxy resin system cured to a semi-solid or solid state are capable of sealing a lost circulation zone, such as a high-injectivity lost circulation zone.

The LCM composition may include an amount of curing agent sufficient to cure the epoxy resins in the LCM composition to a semi-solid or solid state. The LCM compositions may include from 2 wt. % to 30 wt. % curing agent based on the total weight of the LCM composition before curing, such as within 30 minutes of adding the curing agent to the LCM composition. In some embodiments, the LCM composition may have from 2 wt. % to 25 wt. %, from 2 wt. % to 20 wt. %, from 2 wt. % to 15 wt. %, from 2 wt. % to 10 wt. %, from 5 wt. % to 30 wt. %, from 5 wt. % to 25 wt. %, from 5 wt. % to 20 wt. %, from 5 wt. % to 15 wt. %, from 5 wt. % to 10 wt. %, from 10 wt. % to 30 wt. %, from 10 wt. % to 25 wt. %, from 10 wt. % to 15 wt. %, or from 10 wt. % to 20 wt. % curing agent based on the total weight of the LCM composition before curing.

As discussed previously in the present disclosure, the LCM compositions can include one or more weighting materials. The weighting materials may be particulate solids having a specific gravity (SG) that increases the density of the LCM compositions. The weighting material may be included in the LCM composition to increase the density of the LCM composition. The increased density of the LCM composition may increase the hydrostatic pressure exerted by the LCM composition on the formation when initially transferred or injected into the lost circulation zone. This may reduce or prevent loss of the LCM composition to the lost circulation zone until the LCM is cured enough to resist further flow into the formation. For example, in some embodiments, the subterranean formation may require an LCM composition having a greater density to counter hydrostatic forces and prevent flow of the LCM compositions further into the formation during curing of the LCM composition. In order to treat a high-injectivity lost circulation zone having a greater porosity and less resistance to flow, LCM compositions having greater density, greater solids content, or both may enable the LCM to at least partially block the pores and microcracks in the high-injectivity lost circulation zone until the LCM composition can fully set. The weighting material of the LCM compositions of the present disclosure may additionally deposit on the interior surfaces of the pores and microcracks to reduce the size and increase the resistance to flow while the epoxy resin system of the LCM composition cures. The weighting material may also increase the final density of the cured LCM composition. The target final density of the cured LCM composition may depend on the geology of the subterranean formation in the lost circulation zone being treated.

The weighting material may have a specific gravity (SG) of from 2 to 6. Examples of weighting materials may include, but are not limited to, sand, barite (barium sulfate), hematite, calcium carbonate ($CaCO_3$), siderite, ilmenite, silica sand, manganese oxide (MnO), hausmanite (manganese tetraoxide ($Mn_3O_4$), zinc oxide, zirconium oxide, iron oxide, fly ash, or any combination of these weighting materials. In some embodiments, LCM compositions may include barite, calcium carbonate, manganese tetraoxide ($Mn_3O_4$), or combinations of these.

The LCM composition may include an amount of weighting material that increases the density of the LCM composition. In some embodiments, the LCM composition may include from 0.1 wt. % to 70 wt. % weighting material based on the total weight of the LCM composition prior to curing. For example, in some embodiments, the LCM composition may include from 0.1 wt. % to 60 wt. %, from 0.1 wt. % to 50 wt. %, from 0.1 wt. % to 40 wt. %, from 1 wt. % to 70 wt. %, from 1 wt. % to 60 wt. %, from 1 wt. % to 50 wt. %, from 1 wt. % to 40 wt. %, from 5 wt. % to 70 wt. %, from 5 wt. % to 60 wt. %, from 5 wt. % to 50 wt. %, from 5 wt. % to 40 wt. %, from 10 wt. % to 70 wt. %, from 10 wt. % to 60 wt. %, from 10 wt. % to 50 wt. %, or from 20 wt. % to 70 wt. % weighting material based on the total weight of the LCM composition before curing.

As previously discussed, the epoxy resin system of the LCM compositions may include one or a plurality of amide accelerators having at least one amide functional group. The amide accelerators may be operable to increase the rate of cross-linking of the epoxy resin system to reduce the cure time of the LCM compositions. The reduced cure time provided by the amide accelerators may enable LCM compositions to include combinations of epoxy resins and curing agents having lesser dynamic viscosities to enable the LCM compositions to be injected through the drill bit. The amide accelerators may broaden the range of possible epoxy resin/curing agent combinations by enabling inclusion of epoxy resin and curing agent combinations that have greater cure times by themselves without the amide accelerator. The amide accelerators may include at least one amide functional group and, optionally, at least one amine functional group. In some embodiments, the amide accelerator may include at least one of an amide, a polyamide, a tall oil fatty amide, a fatty polyamide, a carboxylic acid terminated fatty polyamide, an amidoamine, a fatty amidoamine, a polyamidoamine, a polyolefin amide alkene amine, or combinations of these, including salts of these compounds. In some embodiments, the amide accelerator may include at least one of a carboxylic acid terminated fatty polyamide, an amidoamine, a polyamidoamine, a polyaminated fatty acid, or combinations of these, including salts of these compounds.

In some embodiments, the amide accelerator may include an amidoamine having chemical formula (VI), which is provided subsequently in this disclosure.

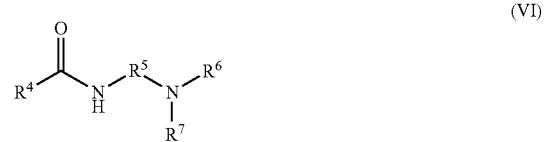

(VI)

In chemical formula (VI), $R^4$ may be a saturated, unsaturated, or cyclic hydrocarbyl having from 3 to 20 carbon atoms, $R^5$ may be a saturated, unsaturated, or cyclic hydrocarbyl having from 2 to 10 carbon atoms, $R^6$ may be hydrogen or a hydrocarbyl having from 1 to 20 carbon atoms, and $R^7$ may be hydrogen or a hydrocarbyl having from 1 to 20 carbon atoms. For example, in some embodiments, $R^5$ may be a saturated hydrocarbyl having 2 carbon atoms, which results in a structure for the amide accelerator shown by chemical formula (VII) provided subsequently in this disclosure.

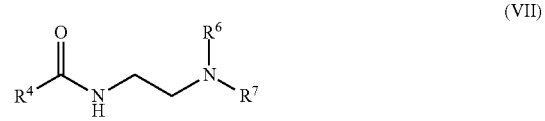

(VII)

In some embodiments, $R^5$ may be a saturated hydrocarbyl having 3 carbon atoms, which results in a structure for the amide accelerator shown in chemical formula (VIII) provided subsequently in this disclosure.

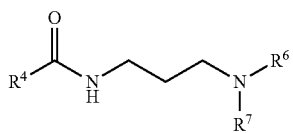 (VIII)

In chemical formulas (VII) and (VIII), $R^4$ may be a saturated, unsaturated, or cyclic hydrocarbyl having from 3 to 20 carbon atoms, $R^6$ may be hydrogen or a hydrocarbyl having from 1 to 20 carbon atoms, and $R^7$ may be hydrogen or a hydrocarbyl having from 1 to 20 carbon atoms, as previous described in this disclosure in relation to chemical formula (VI). In some embodiments, the amide accelerator may be a linear or branched polyamidoamine having repeating units derived from any of chemical formulas (VI), (VII), or (VIII) previously described in this disclosure.

In some embodiments, the amide accelerator may include a carboxylic acid terminated fatty polyamide or a polyaminated fatty acid. In some embodiments, the amide accelerator may be a polyaminated fatty acid having the chemical formula (IX):

 (IX)

where $R^8$ is a hydrocarbyl group and $R^9$ is a hydrocarbyl group or an alkylene carboxylate group having formula $R^{10}COOH$, where $R^{10}$ is a saturated or unsaturated hydrocarbylene. $R^8$ may be a saturated or unsaturated hydrocarbyl group, such as a saturated alkyl ($-C_yH_{2y+1}$ where y is the number of carbon atoms in $R^8$), an unsaturated alkyl ($-C_yH_{(2y-2z-4w+1)}$ where y is the number of carbon atoms in $R^8$, z is zero or a number of double bonds in $R^8$, and w is zero or a number of triple bonds in $R^8$), an alkenyl ($-CH=CHC_yH_{(2y-2z-4w+1)}$ where y is zero or an integer greater than zero, z is zero or a number of additional double bonds in $R^8$, and w is zero or the number of triple bonds in $R^8$), or an alkynyl ($-C\equiv CC_yH_{(2y-2z-4w+1)}$ where y is zero or an integer greater than zero, z is zero or the number of double bonds in $R^8$, and w is zero or a number of additional triple bonds in $R^8$). Each of the general formulas for saturated alkyl, unsaturated alkyl, saturated alkenyl, alkenyl, and alkynyl includes both linear groups and branched groups having 1, 2, 3, 4, 5, or greater than 5 branches at individual carbon atoms. Examples of linear hydrocarbyl groups include, without limitation, linear alkyls of formula $-(CH_2)_yCH_3$ and linear alkenyls of formula $-CH=(CH_2)_yCH_3$ where y is an integer from 0 to 15. Specific examples of linear alkyls include methyl, ethyl, n-propyl, n-butyl, n-hexyl, n-heptyl, n-octyl, n-nonyl, and n-decyl. Specific examples of linear alkenyls include vinyl and allyl. In further examples, $R^8$ may include a cyclic hydrocarbyl group, such as but not limited to a phenyl group, cyclohexyl group, or cycloheptyl group. In embodiments, $R^8$ may be a linear or branched hydrocarbyl group. $R^8$ may have from from 1 to 20 carbon atoms (carbons), such as from 1 to 18 carbons, from 1 to 16 carbons, from 1 to 14 carbons, from 1 to 12 carbons, from 1 to 10 carbons, from 6 to 20 carbons, from 6 to 18 carbons, from 6 to 16 carbons, from 6 to 14 carbons, from 6 to 12 carbons, from 6 to 10 carbons, from 8 to 20 carbons, from 8 to 18 carbons, from 8 to 16 carbons, from 8 to 14 carbons, from 8 to 12 carbons, from 8 to 10 carbons, from 10 to 20 carbons, from 20 to 18 carbons, from 10 to 16 carbons, from 10 to 14 carbons, from 10 to 12 carbons, from 12 to 20 carbons, from 12 to 18 carbons, from 12 to 16 carbons, from 12 to 14 carbons, from 14 to 20 carbons, from 14 to 18 carbons, from 14 to 16 carbons, from 16 to 20 carbons, or 13 carbons. In some embodiments, $R^8$ may be a saturated linear hydrocarbyl group. Alternatively, in other embodiments, $R^8$ may be a branched hydrocarbyl group.

As previously described, $R^9$ can be a hydrocarbyl group or an alkylene carboxylate group having formula $-R^{10}-COOH$, where $R^m$ is a saturated or unsaturated hydrocarbylene group. In embodiments, $R^9$ may be a saturated or unsaturated hydrocarbyl group, such as a saturated alkyl ($-C_yH_{2y+1}$ where y is the number of carbon atoms in $R^9$), an unsaturated alkyl ($-C_yH_{(2y-2z-4w+1)}$ where y is the number of carbon atoms in $R^9$, z is zero or a number of double bonds in $R^9$, and w is zero or a number of triple bonds in $R^9$), an alkenyl ($-CH=CHC_yH_{(2y-2z-4w+1)}$ where y is zero or an integer greater than zero, z is zero or a number of additional double bonds in $R^9$, and w is zero or the number of triple bonds in $R^9$), or an alkynyl ($-C\equiv CC_yH_{(2y-2z-4w+1)}$ where y is zero or an integer greater than zero, z is zero or the number of double bonds in $R^9$, and w is zero or a number of additional triple bonds in $R^9$). Each of the general formulas for saturated alkyl, unsaturated alkyl, saturated alkenyl, alkenyl, and alkynyl includes both linear groups and branched groups having 1, 2, 3, 4, 5, or greater than 5 branches at individual carbon atoms. Examples of linear hydrocarbyl groups include, without limitation, linear alkyls of formula $-(CH_2)_yCH_3$ and linear alkenyls of formula $-CH=(CH_2)_yCH_3$ where y is an integer from 0 to 15. Specific examples of linear alkyls include methyl, ethyl, n-propyl, n-butyl, n-hexyl, n-heptyl, n-octyl, n-nonyl, and n-decyl. Specific examples of linear alkenyls include vinyl and allyl. In further examples, $R^9$ may include a cyclic hydrocarbyl group, such as but not limited to a phenyl group, cyclohexyl group, or cycloheptyl group. $R^9$ may have from 1 to 10 carbons, such as from 1 to 8 carbons, from 1 to 6 carbons, from 1 to 4 carbons, from 2 to 10 carbons, from 2 to 8 carbons, from 2 to 6 carbons, from 2 to 4 carbons, from 4 to 10 carbons, or from 4 to 8 carbons. In some embodiments, $R^9$ may be methyl ($-CH_3$), phenyl ($-(C_6H_5)$), or ethyl ($-CH_2CH_3$).

Alternatively, in other embodiments, $R^9$ may be an alkylene carboxylate group having formula $-R^{10}-COOH$, where $R^{10}$ is a saturated or unsaturated hydrocarbylene group, such as an alkylene, alkenylene, or a cyclic hydrocarbylene. Cyclix hydrocarbylenes may include aromatic or non-aromatic cyclic hydrocarbylenes, such as but are not limited to, phenyl groups, cyclohexyl groups, or combinations of these. $R^{10}$ may have from 1 to 10 carbons, such as from 1 to 8 carbons, from 1 to 6 carbons, from 1 to 4 carbons, from 2 to 10 carbons, from 2 to 8 carbons, from 2 to 6 carbons, from 2 to 4 carbons, from 4 to 10 carbons, or from 4 to 8 carbons. In some embodiments, $R^{10}$ may be $-CH_2CH_2-$ or $-CH=CH-$.

In embodiments, $R^9$ may be selected from the group consisting of methyl, phenyl, $-CH_2CH_2-COOH$, and $-CH=CH-COOH$. For example, in some embodiments, $R^9$ may have the formula $-CH=CH-COOH$, such that the polyaminated fatty acid compound has formula (X):

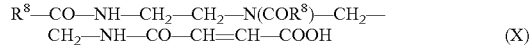 (X)

where $R^8$ is hydrocarbyl group having from 1 to 20 carbon atoms. In another example, $R^9$ may have the formula $-CH_3$ such that the polyaminated fatty acid compound has the formula (XI):

 (XI)

where $R^8$ is hydrocarbyl group having from 1 to 20 carbon atoms. In still another example, $R^9$ may be phenyl ($—(C_6H_5)$) such that the polyaminated fatty acid compound has the formula (XII):

(XII)

where $R^8$ is hydrocarbyl group having from 1 to 20 carbon atoms. In another example, $R^9$ may have the formula $—CH_3$ such that the polyaminated fatty acid compound has the formula (XIII):

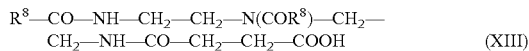
(XIII)

where $R^8$ is hydrocarbyl group having from 1 to 20 carbon atoms.

The polyaminated fatty acid may be synthesized by a two-step process. In the first step, a fatty acid is reacted with diethylene triamine (DETA) to produce an amide and water. The fatty acid has the general chemical formula $R^8—COOH$, where $R^8$ is the hydrocarbyl group previously described with respect to formula (IX).

The fatty acid having formula $R^8—COOH$ may be a naturally-derived or a synthetically-derived fatty acid. The fatty acid may be a naturally-occurring fatty acid, such as a fatty acid derived from natural sources, example of which may include animal fats or vegetable oils. The fatty acid may be produced through hydrolysis of triglycerides, phospholipids, or both triglycerides and phospholipids and removal of glycerol. The triglycerides and phospholipids may be derived from natural sources such as animal fats or vegetable fats. Triglycerides and phospholipids from plant-based sources may include but are not limited to coconut oil, palm oil, soybean oil, tall oil, tall oil fatty acids (TOFA), or combinations of these sources. In some examples, the fatty acid may be a saturated fatty acid resulting from hydrogenation of a naturally-derived unsaturated fatty acid. Alternatively, the fatty acid may be a synthetic fatty acid prepared from a petroleum source or other source through one or more synthesis reactions. In examples, the fatty acid may be a synthetic fatty acid derived through hydrocarboxylation of alkenes. Non-limiting examples of fatty acids may include, but are not limited to, caprylic acid, capric acid, lauric acid, myristic acid, palmitic acid, stearic acid, arachidic acid, myristoleic acid, palmitoleic acid, sapienic acid, oleic acid, elaidic acid, vaccenic acid, linoleic acid, linoelaidic acid, α-linoleic acid, arachidonic acid, eicosapentaenoic acid, or combinations of any of these fatty acids. Other naturally-occurring or synthetic fatty acids are also contemplated. In some embodiments, the fatty acid may be tall oil fatty acid. Tall oil fatty acid may include at least one of palmitic acid, oleic acid, linoleic acid, or combinations of these. In embodiments, the fatty acid may be a tall oil fatty acid derived from distillation of crude tall oil. In one or more embodiments, the fatty acid may include a hydrocarbyl group ($R^8$) having from 12 to 14 carbon atoms. Some example polyaminated fatty acid compounds may be made using a saturated linear fatty acid having a saturated linear hydrocarbyl group $R^8$ with 12 carbon atoms.

In the first reaction step, DETA may be reacted with the fatty acid to produce an intermediate fatty acid amide and water. The reaction for the first step in synthesizing the polyaminated fatty acid is provided subsequently in reaction (RXN1).

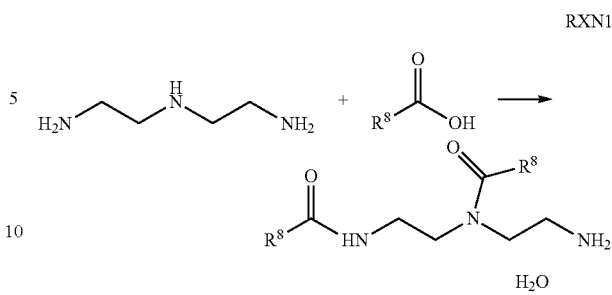

In the second step of synthesizing the polyaminated fatty acid, the intermediate fatty acid amide synthesized in the first step according to reaction (RXN1) may be further reacted with an acid anhydride, such as but not limited to maleic anhydride, acetic anhydride, benzoic anhydride, or succinic anhydride, to form the polyaminated fatty acid. In an example synthesis reaction of the second compound, the acid anhydride may be maleic anhydride. The reaction for the second step using maleic anhydride as the acid anhydride to prepare the compound of formula (X) is provided as reaction (RXN2).

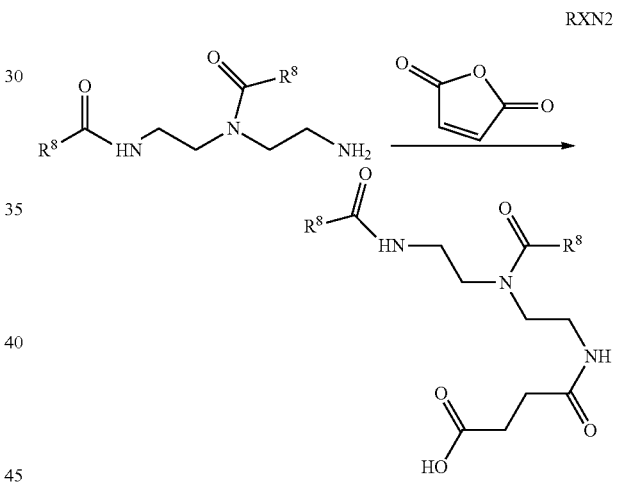

In an analogous manner to reaction (RXN2), if maleic anhydride in reaction (RXN2) is replaced with acetic anhydride, the product is the compound of formula (XI). Likewise, if maleic anhydride in reaction (RXN2) is replaced with benzoic anhydride, the product is the compound of formula (XII). Additionally, if maleic anhydride in reaction (RXN2) is replaced with succinic anhydride, the product is the compound of formula (XIII).

In some embodiments, the amide accelerator may be dispersed in a solvent, such as, but not limited to, water, an organic solvent, or combinations of these. Organic solvents may include, but are not limited to, diesel, biodiesel, mineral oil, plant-based oils, ethers, paraffinic solvents, esters, alcohols, or combinations of these. Plant-based oils may include soybean oil, tall oil, or combinations of these. Ethers may include, but are not limited to, ethylene glycol monobutyl ether, diethylene glycol monobutyl ether, or combinations of these. Alcohol solvents may include but are not limited to ethanol, propanol, isopropanol, butanol, pentanol, or combinations of these.

The LCM compositions may have an amount of the amide accelerator sufficient to reduce the cure time of the epoxy resin system in the LCM compositions. However, too much of the amide accelerator in the LCM compositions may reduce the cure time too much, which may result in curing or setting of the LCM composition before it can be injected into the lost circulation zone. The LCM compositions may have an amount of the amide accelerator sufficient to reduce the curing time while maintaining the ability of the LCM composition to be injected through the drill bit of the drill string into the lost circulation zone without having to install an open-ended pipe or other injection device. The LCM compositions may have greater than or equal to 0.1 wt. %, greater than or equal to 0.5 wt. %, or even greater than or equal to 1.0 wt. % amide accelerators based on the total weight of the LCM composition. In some embodiments, the LCM composition may have from 0.1 wt. % to 20 wt. % amide accelerator based on the total weight of the LCM composition. In some embodiments, the LCM composition may have from 0.1 wt. % to 18 wt. %, from 0.1 wt. % to 15 wt. %, from 0.1 wt. % to 10 wt. %, from 0.5 wt. % to 20 wt. %, from 0.5 wt. % to 18 wt. %, from 0.5 wt. % to 15 wt. %, from 0.5 wt. % to 10 wt. %, from 1 wt. % to 20 wt. %, from 1 wt. % to 18 wt. %, from 1 wt. % to 15 wt. %, from 1 wt. % to 10 wt. %, or from 1 wt. % to 5 wt. % amide accelerators based on the total weight of the LCM composition. The cure time of the LCM compositions may be controlled by increasing or decreasing the amount of the amide accelerators in the LCM compositions.

In some embodiments, the LCM compositions may include other modifiers, such as but not limited to cardanol liquid, polyacrylate flow agents, or combinations of these. Modifiers may be added to the LCM composition to modify one or more properties of the LCM composition, such as but not limited to viscosity, yield point (YP), plastic viscosity (PV), gel strength, density, or combinations of these.

In some embodiments, an LCM composition for sealing lost circulations zones in wellbores may comprise from 20 weight percent (wt. %) to 97 wt. % epoxy resins, from 2 wt. % to 30 wt. % curing agents, from 0.1 wt. % to 70 wt. % weighting materials, and from 0.1 wt. % to 20 wt. % amide accelerator. The amide accelerator includes at least one amide functional group. In some embodiments, the amide accelerator may additionally include an amine functional group. The LCM composition may have a density of greater than or equal to 1121 kg/m$^3$ and may be capable of being injected through a drill bit of a drill string into the lost circulation zone. The epoxy resins may include one or more than one of the epoxy resins described in this disclosure. The curing agents may include one or a plurality of curing agents described in this disclosure. The weighting materials may include one or a plurality of weighting materials described in this disclosure. The amide accelerator may include one or a plurality of the amide accelerators described in this disclosure. The LCM compositions may have an initial dynamic viscosity of from 2.4 kilopascal seconds (kPa*s) to 1,436 kPa*s, where the initial dynamic viscosity of the LCM composition is determined within 30 minutes after adding the curing agent to the LCM composition. The LCM compositions may also have a curing time less than 8 hours, such as less than or equal to 6 hours, or even less than or equal to 4 hours. The LCM composition may include any other constituent, property, or characteristic previously described in this disclosure for the LCM composition.

In some embodiments, the LCM composition for sealing lost circulations circulation zones in wellbores may consist of or consist essentially of from 20 weight percent (wt. %) to 97 wt. % epoxy resins, from 2 wt. % to 30 wt. % curing agents, from 0.1 wt. % to 70 wt. % weighting materials, from 0.1 wt. % to 20 wt. % amide accelerator, and, optionally, from 0.1 wt. % to 40 wt. % additives. The amide accelerator includes at least one amide functional group and may optionally include at least one amine functional group. The LCM compositions may have a density of greater than or equal to 1121 kg/m$^3$ and may be capable of being injected through a drill bit of a drill string into the lost circulation zone. The epoxy resins may include one or more than one of the epoxy resins described in this disclosure. The curing agents may include one or a plurality of curing agents described in this disclosure. The weighting materials may include one or a plurality of weighting materials described in this disclosure. The amide accelerator may include one or a plurality of the amide accelerators described in this disclosure. The LCM compositions may have an initial dynamic viscosity of from 2.4 kilopascal seconds (kPa*s) to 1,436 kPa*s, where the initial dynamic viscosity of the LCM composition is determined within 30 minutes after adding the curing agent to the LCM composition. The LCM compositions may also have a curing time less than 8 hours, such as less than or equal to 6 hours, or even less than or equal to 4 hours. The LCM composition may include any other constituent, property, or characteristic previously described in this disclosure for the LCM composition.

In some embodiments, the LCM compositions may be substantially free of conventional bridging materials, such as but not limited to paper, fibers, nutshells, mica, or combinations of bridging materials. The LCM compositions may have less than 0.1 wt. % conventional bridging materials, such as paper, fibers, cottonseed hulls, nutshells, or mica, based on the total weight of the LCM compositions. In some embodiments, the LCM compositions may be substantially free of proppants. As used in this disclosure, the term "proppant" may refer to solid materials that are used in hydraulic fracturing to "prop" open pores of a subterranean formation and may include but are not limited to sand or ceramic particles operable to maintain fractured pores of a subterranean formation open. In some embodiments, the LCM compositions may include less than 0.1 wt. % proppants, such as sand or ceramic particles, based on the total weight of the LCM composition. In some embodiments, the LCM composition may be substantially free of conventional cements and cement binders.

The viscosity of the LCM compositions may be modified by changing the type of epoxy resins and curing agents included in the LCM composition, or by changing the amounts of the epoxy resins, curing agents, and weighting materials in the LCM compositions. In some embodiments, the viscosity of the LCM composition may be modified by changing the type and amount of epoxy resins in the LCM composition. For example, the viscosity of the LCM composition may be decreased by incorporating an epoxy resin that has a lesser viscosity compared to other epoxy resins in the LCM composition. In some cases, the incorporation of an epoxy resin having a lesser viscosity may increase the cure time of the epoxy resin. In these instances, the cure time of the LCM composition may be modified by changing the type or amount of the one or more amide accelerators in the LCM composition.

The LCM compositions may have an initial dynamic viscosity sufficient to enable the LCM compositions to be injected through the drill bit of the drill string into the lost circulation zone without having to install an open-ended pipe or other injection device. The initial dynamic viscosity of the LCM compositions may refer to the dynamic viscosity of the LCM composition measured immediately after addition of the curing agent to the LCM composition, such as within 30 minutes of adding the curing agent to the LCM composition. In some embodiments, the LCM composition may have an initial dynamic viscosity within a range of from 0.5 pounds of force second per square foot (lbf*s/ft$^2$) to 300 lbf*s/ft$^2$ (equivalent to 2.4 kPa*s to 1,436 kPa*s, where 1 pound force second per square foot is equal to 4.78826 kPa*s). In some embodiments, the LCM composition may have an initial dynamic viscosity of from 2.4 kPa*s to 1200 kPa*s, from 2.4 kPa*s to 1000 kPa*s, from 2.4 kPa*s to 500 kPa*s, from 5 kPa*s to 1436 kPa*s, from 5 kPa*s to 1200 kPa*s, from 5 kPa*s to 1000 kPa*s, from 5 kPa*s to 500 kPa*s, from 50 kPa*s to 1436 kPa*s, from 50 kPa*s to 1200 kPa*s, from 50 kPa*s to 1000 kPa*s, or from 50 kPa*s to 500 kPa*s.

The epoxy resins in the LCM composition are initially in liquid form. As previously described in this disclosure, the epoxy resins build viscosity during curing and eventually cure to a non-porous three-dimensional network. In some embodiments, the LCM compositions may have a cure time of less than or equal to 8 hours, less than or equal to 6 hours, less than or equal to 4 hours, less than or equal to 3 hours, or even less than or equal to 2 hours. In other embodiments, the LCM compositions may have a cure time of from 0.5 hour to 8 hours, from 0.5 hour to 6 hour, from 0.5 hour to 4 hours, from 0.5 hour to 3 hour, from 1 hour to 8 hours, 1 hour to 6 hours, from 1 hour to 4 hours, or from 1 hour to 3 hours. As previously discussed, the cure time of the LCM composition may be adjusted by increasing or decreasing the amount of the amide accelerators in the LCM composition.

The rheology and density of the LCM compositions can be adjusted over a wide range of values depending on the requirement for the well and the downhole conditions of the well. The LCM compositions may have a density that enables the LCM compositions to exert hydrostatic pressure on the formation when introduced to the lost circulation zone. In some embodiments, the LCM composition may have a density of from 70 lbm/ft$^3$ (1121 kg/m$^3$) to 150 lbm/ft$^3$ (2403 kg/m$^3$). The density of the LCM compositions may be determined measured immediately after addition of the curing agent and before substantial curing has occurred, such as within 30 minutes after adding the curing agent to the LCM composition. As used in this disclosure, the term "substantial curing" refers to an amount of curing that produces a change of greater than 5 percent (%) in any rheological property of the LCM composition. The density of the LCM composition may change as curing of the epoxy resin system transitions the LCM composition from a liquid to a semi-solid or solid. In some embodiments, the LCM composition may have a density of from 70 lbm/ft$^3$ to 140 lbm/ft$^3$, from 70 lbm/ft$^3$ to 130 lbm/ft$^3$, from 70 lbm/ft$^3$ to 120 lbm/ft$^3$, from 80 lbm/ft$^3$ to 150 lbm/ft$^3$, from 80 lbm/ft$^3$ to 140 lbm/ft$^3$, from 80 lbm/ft$^3$ to 130 lbm/ft$^3$, from 80 lbm/ft$^3$ to 120 lbm/ft$^3$, from 90 lbm/ft$^3$ to 150 lbm/ft$^3$, from 90 lbm/ft$^3$ to 140 lbm/ft$^3$, from 90 lbm/ft$^3$ to 130 lbm/ft$^3$, from 90 lbm/ft$^3$ to 120 lbm/ft$^3$, from 100 lbm/ft$^3$ to 150 lbm/ft$^3$, from 100 lbm/ft$^3$ to 140 lbm/ft$^3$, from 100 lbm/ft$^3$ to 130 lbm/ft$^3$, or from 100 lbm/ft$^3$ to 120 lbm/ft$^3$.

The LCM composition may have a gel strength before curing that maintains the pump-ability of the LCM composition to prevent stuck-pipe problems and enables the LCM composition to be injected through the drill bit of the drill string into the lost circulation zone. In some embodiments, the LCM composition may have a density of greater than 90 lbm/ft$^3$ or greater than 120 lbm/ft$^3$, and may have a gel strength that enables the LCM composition to suspend the weighting materials added to increase the density. In some embodiments, the LCM composition may have a gel strength before curing that prevents the LCM composition from flowing further into the formation after injection of the LCM composition into the lost circulation zone. In some embodiments, the LCM compositions may have a 10-second gel strength of from 0.1 pound of force per square foot (lbf/100 ft$^2$) to 20 lbf/100 ft$^2$, from 0.1 lbf/100 ft$^2$ to 10 lbf/100 ft$^2$, from 0.1 lbf/100 ft$^2$ to 5 lbf/100 ft$^2$, from 1 lbf/100 ft$^2$ to 20 lbf/100 ft$^2$, from 1 lbf/100 ft$^2$ to 10 lbf/100 ft$^2$, from 1 lbf/100 ft$^2$ to 5 lbf/100 ft$^2$, from 5 lbf/100 ft$^2$ to 20 lbf/100 ft$^2$, from 5 lbf/100 ft$^2$ to 10 lbf/100 ft$^2$, or from 0.1 lbf/100 ft$^2$ to 1 lbf/100 ft$^2$ measured immediately after addition of the curing agent and before substantial curing has taken place, such as within 30 minutes of adding the curing agent to the LCM composition. In some embodiments, the LCM composition may have a 10-minute gel strength of from 0.1 lbf/100 ft$^2$ to 30 lbf/100 ft$^2$, from 0.1 lbf/100 ft$^2$ to 20 lbf/100 ft$^2$, from 0.1 lbf/100 ft$^2$ to 10 lbf/100 ft$^2$, from 0.1 lbf/100 ft$^2$ to 5 lbf/100 ft$^2$, from 1 lbf/100 ft$^2$ to 30 lbf/100 ft$^2$, from 1 lbf/100 ft$^2$ to 20 lbf/100 ft$^2$, from 1 lbf/100 ft$^2$ to 10 lbf/100 ft$^2$, from 1 lbf/100 ft$^2$ to 5 lbf/100 ft$^2$, from 5 lbf/100 ft$^2$ to 30 lbf/100 ft$^2$, from 5 lbf/100 ft$^2$ to 20 lbf/100 ft$^2$, from 5 lbf/100 ft$^2$ to 10 lbf/100 ft$^2$, from 10 lbf/100 ft$^2$ to 30 lbf/100 ft$^2$, from 10 lbf/100 ft$^2$ to 20 lbf/100 ft$^2$, or from 20 lbf/100 ft$^2$ to 30 lbf/100 ft$^2$ measured immediately after addition of the curing agent and before substantial curing has taken place, such as within 30 minutes of adding the curing agent to the LCM composition. The 10-second gel strength and 10-minute gel strength may be determined according to the test methods subsequently described in this disclosure.

The plastic viscosity (PV) of a fluid relates to the resistance of a fluid to flow due to mechanical interaction between the solids of the fluid and represents the viscosity of the fluid extrapolated to infinite shear rate. The LCM compositions may have a PV that enables the LCM compositions to be injected through the drill bit of the drill string and into the lost circulation zone, such as a high-injectivity lost circulation zone. The PV of the LCM compositions may be measured immediately after addition of the curing agent and before substantial curing has taken place, such as within 30 minutes of adding the curing agent to the LCM composition. The PV of the LCM composition may be determined in accordance with the test methods subsequently described in this disclosure. In some embodiments, the LCM compositions may have a PV of from 0.1 centipoise (cP) to 50 cP, from 0.1 cP to 30 cP, from 0.1 cP to 20 cP, from 0.1 cP to 10 cP, from 1 cP to 50 cP, from 1 cP to 30 cP, from 1 cP to 20 cP, from 1 cP to 10 cP, from 5 cP to 50 cP, from 5 cP to 30 cP, from 5 cP to 20 cP, or from 5 cP to 10 cP measured immediately after addition of the curing agent and before substantial curing has taken place (1 cP=1 millipascal second (mPa-s). The PV of the LCM compositions may depend on the quantity of solids added to the LCM compositions. For example, increasing the amount of weighting materials included in the LCM compositions may increase the PV of the LCM compositions.

The yield point (YP) of a fluid relates to the amount of stress required to move the fluid from a static condition. In some embodiments, the LCM compositions may have a YP that prevents the LCM composition from flowing further into the formation once the LCM composition has been introduced to the formation, such as by injection through the drill bit of the drill string. In some embodiments, the LCM composition may have a YP that enables the LCM composition to suspend the weighting materials in the LCM composition and reduce or prevent settling of the weighting materials. In some embodiments, the LCM composition may have a YP of from 0.1 lbf/100 ft² to 400 lbf/100 ft², from 0.1 lbf/100 ft² to 300 lbf/100 ft², from 0.1 lbf/100 ft² to 200 lbf/100 ft², from 0.1 lbf/100 ft² to 100 lbf/100 ft², from 0.1 lbf/100 ft² to 10 lbf/100 ft², from 1 lbf/100 ft² to 400 lbf/100 ft², from 1 lbf/100 ft² to 300 lbf/100 ft², from 1 lbf/100 ft² to 200 lbf/100 ft², from 1 lbf/100 ft² to 100 lbf/100 ft², from 1 lbf/100 ft² to 10 lbf/100 ft², from 10 lbf/100 ft² to 400 lbf/100 ft², from 10 lbf/100 ft² to 300 lbf/100 ft², from 10 lbf/100 ft² to 200 lbf/100 ft², from 10 lbf/100 ft² to 100 lbf/100 ft², from 100 lbf/100 ft² to 400 lbf/100 ft², from 100 lbf/100 ft² to 300 lbf/100 ft², from 100 lbf/100 ft² to 200 lbf/100 ft², from 200 lbf/100 ft² to 400 lbf/100 ft², or from 300 lbf/100 ft² to 400 lbf/100 ft².

The epoxy resins of the LCM compositions, once cured, may be more chemically resistant than conventional cement compositions. For example, the fluids from the subterranean formation, such as hydrocarbon gases, crude oil, or produced water, may include hydrogen sulfide gas ($H_2S$), which is highly corrosive. In some embodiments, the cured epoxy polymers of the LCM compositions of the present disclosure may be resistant to corrosion caused by $H_2S$ gas present in fluids in the subterranean formation.

The LCM compositions may be used for sealing lost circulation zones in a wellbore under a range of different downhole conditions. For example, in some embodiments, the LCM composition may be adapted to different downhole conditions by changing the concentrations of the epoxy resin, the curing agents, the amide accelerators, or the weighting materials in the LCM compositions to modify the specific gravity, viscosity, mechanical properties, curing time, or other properties of the LCM compositions. The LCM compositions may be capable of withstanding a wide range of temperatures and pressures without failing or deteriorating to allow liquids or gases to penetrate into or through the LCM compositions. For example, the LCM compositions, once cured, may be capable of withstanding temperatures of from 20 degrees Celsius (° C.) to 205° C. The cured LCM compositions may also be able to withstand temperature cycling within a temperature range of from 20° C. to 205° C. The cured LCM compositions may be capable of withstanding pressures of up to 4,000,000 psi (27,580 megapascals (MPa)) (1 psi equals 0.00689476 MPa). For example, in some embodiments, the cured LCM compositions may be capable of withstanding pressures of from 14 psi (96 kPa or 0.096 MPa) to 4,000,000 psi (27,580 MPa) without failing or deteriorating to allow liquids or gases to penetrate into or through the LCM compositions.

The LCM compositions may be used in a method to isolate a lost circulation zone of a wellbore. A method of treating a lost circulation zone of a wellbore may include introducing the LCM composition into the lost circulation zone and curing the LCM composition in the lost circulation zone to produce a barrier operable to prevent wellbore fluids from passing into the lost circulation zone. The LCM composition may include from 20 wt. % to 97 wt. % epoxy resins, from 2 wt. % to 30 wt. % curing agents, from 0.1 wt. % to 70 wt. % weighting materials, and from 0.1 wt % to 20 wt. % amide accelerators, where the amide accelerators include at least one amide functional group. In some embodiments, the amide accelerators may also include at least one amine functional group. The epoxy resins may include one or more than one of the epoxy resins described in this disclosure. The curing agents may include one or a plurality of curing agents described in this disclosure. The weighting materials may include one or a plurality of weighting materials described in this disclosure. The amide accelerator may include one or a plurality of the amide accelerators described in this disclosure. The LCM composition may have a density of greater than or equal to 1121 kg/m³. The LCM composition may have an initial dynamic viscosity of from 2.4 kPa*s to 1,436 kPa*s, where the initial dynamic viscosity of the LCM composition is determined within 30 minutes after adding the curing agent to the LCM composition. The LCM composition may have a curing time of less than 8 hours, such as less than or equal to 6 hours, or less than or equal to 4 hours. The LCM composition may include any other constituent, property, or characteristic previously described in this disclosure for the LCM compositions. After curing, the lost circulation zone may be isolated from the other portions of the wellbore by the cured LCM composition.

Introducing the LCM composition into the lost circulation zone may include injecting the LCM composition through the drill bit of the drill string. In some embodiments, the drill string may not be removed from the wellbore prior to introducing the LCM composition to the lost circulation zone. The LCM compositions of the present disclosure are injectable through the drill bit so that the drill string does not need to be removed from the wellbore to replace the drill bit with an open-ended pipe or other injection device before injecting the LCM composition into the lost circulation zone. Although described in this disclosure as being able to be injected through the drill bit, the LCM compositions may also be injected through other methods or techniques, such as but not limited to squeezing, injection through tubing, injection through the casing, or injection through the annulus. In some embodiments, the lost circulation zone may be a high-injectivity zone having an injectivity factor of less than or equal to 4000 pounds of force per square inch*min per barrel, in which a barrel is equal to 42 United States (U.S.) Gallons and the injectivity factor is defined as the quotient of the injection pressure in pounds of force per square inch divided by the injection rate in barrels per minute.

The method may further include introducing a spacer fluid into the lost circulation zone before introducing the LCM composition. In some embodiments, the LCM composition may not be compatible with the drilling fluid or other fluid present in the wellbore. The spacer fluid may displace the fluid present in the wellbore before the LCM composition is pumped into the well bore. The spacer fluid may maintain the LCM composition separate from the fluids already present in the wellbore to reduce or prevent degradation of the LCM composition, fluid in the wellbore or both. The spacer fluid may be compatible with the fluids present in the wellbore as well as the LCM compositions. The method may further include introducing a displacement fluid after the LCM composition to displace the LCM composition into the lost circulation zone. The displacement fluid may push the LCM composition into the lost circulation to increase the amount of LCM composition in the lost circulation zone and reduce curing of the LCM composition in the wellbore, in particular in completed portions of the wellbore closer to the surface. In some embodiments, a packer may be utilized to direct placement of the LCM composition into the lost circulation zone. The method may further include drilling through at least a portion of the barrier formed by the cured LCM composition to continue drilling the wellbore. In some embodiments, one or more subsequent treatments with the LCM composition may be conducted to fully treat the lost circulation zone.

Test Methods

Viscosity

The viscosity of the sealing compositions or LCM compositions may be measured using a standard oilfield viscometer, such as a FANN® Model 35 viscometer manufactured by Fann Instrument Company for example, according to test methods provided in the API Recommended Practice For Cementing (RP 10B). The viscosity is reported as shear stress in units of pounds of force per 100 square feet (lbf/100 ft$^2$). The viscometer may also be used to measure the shear rate of the sealing compositions or LCM compositions.

Gel Strength

The gel strength refers to the shear stress of the sealing composition or LCM composition measured at a reduced shear rate following a defined period of time during which the sealing composition is maintained in a static state. The shear stress of the composition at reduced shear rate may be measured using a standard oilfield viscometer, such as a FANN® Model 35 viscometer operated at reduced rpms, such as at 3 rpm, according to the test methods described in API Recommended Practice On Determining the Static Gel Strength of Cement Formulations (RP 10B-6/ISO 10426-6: 2008). To measure the gel strength, the sealing composition or LCM composition is first stirred by contacting the composition with the spindle of the viscometer and operating the viscometer at 600 rotations per minute (rpm). The viscometer is then turned off for period of time (time period). For a 10-second gel strength, the time period is 10 seconds, and for a 10-minute gel strength, the time period is 10 minutes. It should be understood that other time periods for measuring gel strength may be used as reference times for measurements of gel strength. During the time period, the composition comes to rest in a static state. Upon expiration of the time period, the viscometer is turned back on at a reduced speed, such as 3 rpm for example, to generate a reduced shear rate. The viscometer reading is then taken. The gel strength of the sealing composition or LCM composition is reported in units of pounds of force per 100 square feet (lbf/100 ft$^2$).

Plastic Viscosity (PV) and Yield Point (YP)

The rheology of the sealing compositions and LCM compositions may be modeled based on Bingham plastic flow behavior. In particular, the sealing compositions and LCM compositions may behave as a rigid body at lesser shear stress but flow as a viscous fluid at greater shear stress. The rheological behavior of the compositions may be determined by measuring the shear stress on the composition at different shear rates, which may be accomplished by measuring the shear stress, the shear rate, or both on the composition using a FANN® Model 35 viscometer operated at 3 rpm, 6 rpm, 100 rpm, 200 rpm, 300 rpm, or 600 rpm, for example. The rheology of the sealing composition or LCM composition may be evaluated from the plastic viscosity (PV) and the yield point (YP), which are parameters from the Bingham plastic rheology model. The PV is related to the resistance of the composition to flow due to mechanical interaction between the solids of the composition and represents the viscosity of the composition extrapolated to infinite shear rate. The PV reflects the type and concentration of the solids, such as weighting materials, in the sealing composition or LCM composition, and a lesser PV is preferred. The PV of the sealing composition or LCM composition may be estimated by measuring the shear stress of the composition using a FANN® Model 35 viscometer at spindle speeds of 300 rotations per minute (rpm) and 600 rpm and subtracting the 300 rpm viscosity measurement from the 600 rpm viscosity measurement according to Equation 3 (EQU. 3), which is subsequently provided. The PV values determined for the sealing compositions and LCM compositions are provided in this disclosure in units of centipoise (cP).

$$PV = (\text{viscosity at 600 rpm}) - (\text{viscosity at 300 rpm}) \quad \text{EQU. 3}$$

The PV may also be determined from dial readings at any two spindle speeds according to the Equation 4 (EQU. 4), which is subsequently provided.

$$PV = \frac{300}{(N_2 - N_1)}(X_{N_2} - X_{N_1}) \quad \text{EQU. 4}$$

In EQU. 4, $N_1$ is a slower spindle speed of a viscometer and $N_2$ is a greater spindle speed of the viscometer. The term $X_{N1}$ at spindle speed $N_1$, and $X_{N2}$ is the viscometer reading at spindle speed $N_2$.

At shear stress less than the YP of the sealing composition, the sealing composition behaves as a rigid body, and at shear stress greater than the YP of the sealing composition, the sealing composition flows as a viscous fluid. In other words, the YP represents the amount of stress required to move a fluid from a static condition. The YP is determined by extrapolating the Bingham plastic rheology model to a shear rate of zero. The YP of the sealing composition or the LCM composition may be estimated from the PV from EQU. 3 by subtracting the PV from the shear stress measured at 300 rpm according to Equation 5 (EQU. 5), which is provided subsequently.

$$YP = (300 \text{ rpm reading}) - PV \quad \text{EQU. 5}$$

The YP calculated from EQU. 5 is expressed as a force per area, such as pounds of force per one hundred square feet (lbf/100 ft$^2$) for example. The methods for measuring and determining PV and YP for the sealing compositions are consistent with methods conventionally used for drilling fluids in general.

EXAMPLES

The following examples illustrate one or more features of the present disclosure. It should be understood that these examples are not intended to limit the scope of the disclosure or the appended claims in any manner. In these Examples, Table 1 is subsequently included in this disclosure and provides a cross-reference for the epoxy resins utilized in the LCM compositions evaluated in these Examples.

TABLE 1

| Cross-Reference of Epoxy Resins | |
|---|---|
| Epoxy Resin ID | Epoxy Resin Name |
| Resin 1 | bisphenol-A-epichlorohydrin epoxy resin with the reactive diluent oxirane mono [(C12-C14)-alkyloxy)methyl] derivatives |
| Resin 2 | C12-C14 alkyl glycidyl ether |
| Resin 3 | 80 wt. % Resin 1 and 20 wt. % Resin 2 |

Example 1: Rheological Properties of Epoxy Resins

Resin 1 and Resin 3 (80:20 mixture of Resin 1 and Resin 2 by weight) were evaluated for rheological properties according to the test methods previously described in this disclosure. In particular, the viscosity data for Resin 1 and Resin 3 were determined using a FANN® 35 rheometer operated at a temperature of 75° F. The rheological properties of the Resin 1 and Resin 3 were determined without addition of the curing agent, weighting material, or other additives. The rheological properties measured for Resin 1 and Resin 3 are shown in Table 2, which is subsequently provided in this disclosure.

TABLE 2

Rheological Properties of Resin 1 and Resin 3

| Rheological Property | Resin 1 | Resin 3 |
|---|---|---|
| Shear Stress at 600 rpm (lbf/100 ft$^2$) | * | * |
| Shear Stress at 300 rpm (lbf/100 ft$^2$) | * | 265 |
| Shear Stress at 200 rpm (lbf/100 ft$^2$) | * | 175 |
| Shear Stress at 100 rpm (lbf/100 ft$^2$) | * | 90 |
| Shear Stress at 6 rpm (lbf/100 ft$^2$) | 21 | 6 |
| Shear Stress at 3 rpm (lbf/100 ft$^2$) | 10 | 3 |

* shear stress values were greater than the measureable range of the rheometer

As shown in Table 2, Resin 3, which included a mixture of Resin 1 and Resin 2, exhibited lesser rheology as shown by the lesser shear stress values over the range of 3 rpm to 300 rpm compared to the shear stress values for Resin 1. As demonstrated by the results in Table 2, the properties of the sealing compositions, LCM compositions, or both may be adjusted by adding or substituting different epoxy resins. For example, by combining Resin 2 with Resin 1, the viscosities of the epoxy resin system and the resulting LCM compositions can be reduced.

Example 2: Thickening Time Test for an LCM Composition Comprising an Amide Accelerator In Example 2, a thickening time test for an LCM composition according to the present disclosure and having an amide accelerator was performed. The composition of the LCM composition of Example 2 is provided in Table 3 subsequently provided in this disclosure.

TABLE 3

LCM Compositions for Example 2 and Examples 3-5

| | Example 2 | | Examples 3-5 | |
|---|---|---|---|---|
| Constituent | Grams (g) | Concentration (wt. %) | Grams (g) | Concentration (wt. %) |
| Resin 1 | 320 | 28.0 | 320 | 28.0 |
| Resin 2 | 80 | 7.0 | 80 | 7.0 |
| Amide Accelerator | 32 | 2.8 | 31 | 2.7 |
| Calcium Carbonate Weighting Material | 60 | 5.2 | 60 | 5.3 |
| Barite Weighting Material | 640 | 55.9 | 640 | 56.0 |
| Curing Agent | 12.4 | 1.1 | 11.5 | 1.0 |

For Example 2, the LCM composition was prepared by combining Resin 1, Resin 2, and the barite and calcium carbonate weighting materials. Last, the curing agent and the amide accelerator were added. The curing agent was diethylenetriamine (DETA), which was RAZEEN® Cure curing agent (90-100% DETA) obtained from Jubail Chemical Industries LLC of Jubail, Saudi Arabia. The amide accelerator was a polyaminated fatty acid having chemical formula (X):

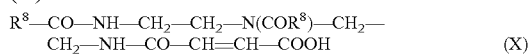

$$R^8\text{—CO—NH—CH}_2\text{—CH}_2\text{—N(COR}^8\text{)—CH}_2\text{—CH}_2\text{—NH—CO—CH=CH—COOH} \quad (X)$$

in which $R^8$ was a saturated hydrocarbyl having from 16 to 18 carbon atoms. The polyaminated fatty acid of the amide accelerator of Example 2 was prepared from distilled tall oil fatty acid, DETA, and maleic anhydride according to the synthesis process previously described in the present disclosure in relation to RXN1 and RXN2.

After adding the curing agent and the amide accelerator, the LCM composition of Example 2 was mixed for 5 minutes. The density of the LCM composition was measured to be 123 lb/ft$^3$ (1970 kg/m$^3$).

The thickening time test was conducted under conditions simulating downhole temperature and pressure conditions using a high temperature high pressure (HTHP) consistometer obtained from Chandler Engineering. The LCM composition of Example 2 was introduced to the HTHP consistometer, and the temperature and pressure of the LCM composition was gradually increased over a period of 30 minutes. The temperature of the LCM composition was increased to a temperature of 196 degrees Fahrenheit (° F.) (91° C.) to simulate a bottom hole circulating temperature (BHCT) of 91° C., and the pressure was ramped up to a final pressure of 8000 pounds per square inch (psi) (55,158 kPa). The thickening time and Bearden consistency were measured using the HTHP consistometer. It was observed that the LCM composition of Example 2 had a thickening time of 6 hours and 12 minutes and exhibited a final Bearden consistency of 22 BC.

Examples 3-5: Effects of Duration of Mixing the LCM Composition after Adding the Amide Accelerator on the Thickening Time In Examples 3-5, the effects of increasing the duration of mixing the LCM composition after adding the amide accelerator on the thickening time and Bearden consistency were investigated. The LCM composition for Examples 3-5 is in Table 3, which was previously provided in this disclosure. For each of Examples 3-5, the LCM composition was prepared by combining Resin 1, Resin 2, the barite weighting material, and the calcium carbonate weighting material. The curing agent was then added followed by the amide accelerator. The curing agent and amide accelerator were the same as those used in Example 2. After adding the amide accelerator, each of the LCM compositions of Examples 3-5 were mixed for a different mixing duration. The mixing duration of mixing the LCM compositions of Examples 3-5 are in Table 4, which is provided subsequently in this disclosure.

The thickening time test was conducted under conditions simulating downhole temperature and pressure conditions using a high temperature high pressure (HTHP) consistometer obtained from Chandler Engineering. Each of the LCM compositions of Example 2 were introduced to the HTHP consistometer, and the temperature and pressure of each LCM composition was gradually increased over a period of 30 minutes. The temperature of each LCM composition was increased to a temperature of 196 degrees Fahrenheit (° F.) (91° C.) to simulate a bottom hole circulating temperature (BHCT) of 91° C., and the pressure of each was ramped up to a final pressure of 8000 pounds per square inch (psi) (55,158 kPa). The thickening time and Bearden consistency for each of the LCM compositions of Examples 3-5 were measured using the HTHP consistometer and the results are in Table 4, which is provided subsequently in this disclosure.

TABLE 4

Thickening Time and Bearden Consistency of the LCM Compositions of Examples 3-5

| Example | Example 3 | Example 4 | Example 5 |
|---|---|---|---|
| Mixing Duration (minutes) | 5 | 10 | 15 |
| Density (lbm/ft3) | 123 | 123 | 120 |
| Thickening Time (hours:minutes) | 4:46 | 4:00 | 4:18 |
| Bearden Consistency (Bc) | 20 | 43 | 100 |

As shown in Table 4, increasing the duration of mixing the LCM composition after adding the accelerator increases the Bearden consistency of the LCM composition. In other words, increasing the mixing duration may reduce the time for a given LCM composition having the amide accelerator to thicken to a semi-solid or solid material sufficient to seal a lost circulation zone of a wellbore.

Comparative Example 6: Thickening Time Test for a Comparative LCM Composition without an Amide Accelerator In Comparative Example 6, a thickening time test for a comparative LCM composition based on an epoxy resin system described in the present disclosure but without the amide accelerator was conducted as a comparison to the LCM composition of Example 5. The composition for the comparative LCM composition of Comparative Example 6 is in Table 5 provided subsequently in this disclosure.

TABLE 5

Composition of the Comparative LCM Composition of Comparative Example 6 and the LCM Composition of Example 5

| | Comparative Example 6 | | Example 5 | |
|---|---|---|---|---|
| Constituent | Grams (g) | Concentration (wt. %) | Grams (g) | Concentration (wt. %) |
| Resin 1 | 320 | 28.8 | 320 | 28.0 |
| Resin 2 | 80 | 7.2 | 80 | 7.0 |
| Amide Accelerator | — | — | 31 | 2.7 |
| Calcium Carbonate Weighting Material | 60 | 5.4 | 60 | 5.3 |
| Barite Weighting Material | 640 | 57.6 | 640 | 56.0 |
| Curing Agent | 11.5 | 1.0 | 11.5 | 1.0 |

For Comparative Example 6, the comparative LCM composition was prepared by adding Resin 1 and Resin 2 (equivalent to Resin 3) the barite and calcium carbonate weighting materials. Last, the curing agent was added. The curing agent was diethylenetriamine (DETA), which was RAZEEN® Cure curing agent (90-100% DETA) obtained from Jubail Chemical Industries LLC of Jubail, Saudi Arabia. After adding the curing agent, the comparative LCM composition was mixed for 60 minutes. The thickening time test was conducted under conditions simulating downhole temperature and pressure conditions. The temperature and pressure of the comparative LCM composition of Comparative Example 6 was ramped up over a period of 30 minutes. The temperature of the comparative LCM composition was ramped up to a temperature of 196 degrees Fahrenheit (° F.) (91° C.) to simulate a bottom hole circulating temperature (BHCT) of 91° C., and the pressure was ramped up to a final pressure of 8000 pounds per square inch (psi) (55,158 kPa). The thickening time of the comparative LCM composition of Comparative Example 6 was over six hours, but the comparative LCM composition took greater than 2 days to cure to a hard epoxy. The thickening time was measured using a high temperature high pressure (HTHP) consistometer obtained from Chandler Engineering.

Comparison of the comparative LCM composition of Comparative Example 6 to the LCM composition of Example 5, which included the amide accelerator, shows that including the amide accelerator can greatly decrease the curing time of the LCM composition to cure to a semi-solid or solid cured epoxy. Thus, inclusion of the amide accelerator in the LCM composition may enable the viscosity of the LCM composition to be reduced through the use of lesser viscosity epoxy resins while still maintaining the ability of the LCM composition to cure in a short amount of time of less than 8 hours, less than 6 hours, or even less than 4 hours.

In a first aspect of the present disclosure, a method of treating a lost circulation zone of a wellbore may include introducing a lost circulation material (LCM) composition into the lost circulation zone. The LCM composition may include 20 weight percent to 97 weight percent epoxy resin, 2 weight percent to 30 weight percent curing agent, 0.1 weight percent to 70 weight percent weighting material, and 0.1 weight percent to 20 weight percent amide accelerator. The LCM composition may have a density of greater than or equal to 1121 kilograms per cubic meter. Introducing the LCM composition into the lost circulation zone may include injecting the LCM composition through a drill bit of a drill string. The method may further include curing the LCM composition in the lost circulation zone to produce a barrier operable to prevent wellbore fluids from passing into the lost circulation zone.

A second aspect of the present disclosure may include the first aspect, in which the lost circulation zone is a high-injectivity zone having an injectivity factor of less than or equal to 4000 pounds of force per square inch*min per barrel, in which a barrel is equal to 42 United States (U.S.) Gallons and the injectivity factor is defined as the quotient of the injection pressure in pounds of force per square inch divided by the injection rate in barrels per minute.

A third aspect of the present disclosure may include either the first or second aspects, in which the drill string is not removed from the wellbore prior to introducing the LCM composition to the lost circulation zone.

A fourth aspect of the present disclosure may include any one of the first through third aspects, further comprising introducing a spacer fluid into the lost circulation zone before introducing the LCM composition.

A fifth aspect of the present disclosure may include any one of the first through fourth aspects, further comprising introducing a displacement fluid after the LCM composition to displace the LCM composition into the lost circulation zone.

A sixth aspect of the present disclosure may include any one of the first through fifth aspects, further comprising drilling through at least a portion of the barrier formed by the cured LCM composition to continue drilling the wellbore.

In a seventh aspect of the present disclosure, a lost circulation material (LCM) composition for sealing lost circulation zones in wellbores may include 20 weight percent to 97 weight percent epoxy resin, 2 weight percent to 30 weight percent curing agent, 0.1 weight percent to 70 weight percent weighting material, and 0.1 weight percent to 20 weight percent amide accelerator. The LCM composition has a density of greater than or equal to 1121 kilograms per cubic meter and is capable of being injected through a drill bit of a drill string into the lost circulation zone.

An eighth aspect of the present disclosure may include any one of the first through seventh aspects, in which the LCM composition may have an initial dynamic viscosity of from 2.4 kilopascal seconds (kPa*s) to 1,436 kPa*s. The initial dynamic viscosity of the LCM composition may be determined within 30 minutes after adding the curing agent to the LCM composition.

A ninth aspect of the present disclosure may include any one of the first through eighth aspects, in which the LCM composition has a curing time less than 8 hours.

A tenth aspect of the present disclosure may include any one of the first through ninth aspects, in which the amide accelerator may include at least one of an amide, a polyamide, a tall oil fatty amide, a fatty polyamide, a carboxylic acid terminated fatty polyamide, a polyaminated fatty acid, an amidoamine, fatty amidoamine, a polyamidoamine, a polyolefin amide alkene amine, or combinations of these.

An eleventh aspect of the present disclosure may include any one of the first through tenth aspects, in which the amide accelerator may comprise at least one of a carboxylic acid terminated fatty polyamide, a polyaminated fatty acid, an amidoamine, a polyamidoamine, or combinations of these.

A twelfth aspect of the present disclosure may include any one of the first through eleventh aspects, in which the amide accelerator is a polyaminated fatty acid.

A thirteenth aspect of the present disclosure may include any one of the first through twelfth aspects, in which the amide accelerator may be a polyaminated fatty acid having the chemical formula (IX):

where $R^8$ is a hydrocarbyl group and $R^9$ is a hydrocarbyl group or an alkylene carboxylate group having formula —$R^{10}$—COOH, where $R^{10}$ is a saturated or unsaturated hydrocarbylene.

A fourteenth aspect of the present disclosure may include any one of the first through eleventh aspects, in which the amide accelerator is an amidoamine having the following chemical formula (VI):

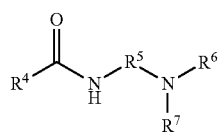

in which $R^4$ includes a saturated, unsaturated, or cyclic hydrocarbyl having from 3 to 20 carbon atoms, $R^5$ is a saturated, unsaturated, or cyclic hydrocarbyl having from 2 to 10 carbon atoms, $R^6$ is hydrogen or a hydrocarbyl having from 1 to 20 carbon atoms, and $R^7$ is hydrogen or a hydrocarbyl having from 1 to 20 carbon atoms.

A fifteenth aspect of the present disclosure may include any one of the first through fourteenth aspects, in which the epoxy resin comprises 1,6-hexanediol diclycidyl ether, alkyl glycidyl ethers having from 12 to 14 carbon atoms, butyl glycidyl ether, 2,3-epoxypropyl o-tolyl ether, cyclohexanedimethanol diclycidyl ether, bisphenol-A-epichlorohydrin epoxy resin, or combinations of these.

A sixteenth aspect of the present disclosure may include any one of the first through fifteenth aspects, in which the epoxy resin comprises from 0.1 weight percent to 80 weight percent bisphenol-A-epichlorohydrin epoxy resin based on the total weight of the epoxy resins in the composition, and the epoxy resin further comprises a reactive diluent.

A seventeenth aspect of the present disclosure may include any one of the first through sixteenth aspects, in which the epoxy resin comprises bisphenol-A-epichlorohydrin epoxy resin and butyl glycidyl ether.

An eighteenth aspect of the present disclosure may include any one of the first through seventeenth aspects, in which the epoxy resin may include cyclohexanedimethanol diclycidyl ether.

A nineteenth aspect of the present disclosure may include any one of the first through fifteenth aspects, in which the epoxy resin comprises bisphenol-A-epichlorohydrin epoxy resin with the reactive diluent oxirane mono [($C_{12}$-$C_{14}$)-alkyloxy) methyl] derivatives, 2,3-epoxypropyl-o-tolyl ether, or combinations of these.

A twentieth aspect of the present disclosure may include any of the first through nineteenth aspects, in which the curing agent comprises at least one of at least one of trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), beta-hydroxyalkyl amide (HAA), diethyltoluenediamine (DETDA), polyoxypropylene diamine, or combinations of these.

A twenty-first aspect of the present disclosure may include any of the first through twentieth aspects, in which the curing agent comprises at least one of diethylenetriamine, diethyltoluenediamine, polyoxypropylene diamine, or combinations of these.

A twenty-second aspect of the present disclosure may include any of the first through twenty-first aspects, in which the weighting material comprises at least one of sand, barite (barium sulfate), hematite, calcium carbonate, siderite, ilmenite, silica sand, manganese oxide (MnO), hausmanite (manganese tetraoxide ($Mn_3O_4$)), zinc oxide, zirconium oxide, iron oxide, fly ash, or any combination of these weighting materials.

A twenty-third aspect of the present disclosure may include any one of the first through eleventh aspects, in which the epoxy resin comprises bisphenol-A-epichlorohydrin epoxy resin with the reactive diluent oxirane mono [($C_{12}$-$C_{14}$)-alkyloxy) methyl] derivatives, 2,3-epoxypropyl-o-tolyl ether, of combinations of these. The curing agent may include diethylenetriamine. The weighting material may include barite, calcium carbonate, or combinations of these. The amide accelerator may include at least a carboxylic acid terminated fatty polyamide or a polyaminated fatty acid.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates the contrary. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A lost circulation material (LCM) composition for sealing lost circulation zones in wellbores, the LCM composition comprising:
    20 weight percent to 97 weight percent epoxy resin, where the epoxy resin comprises 1,6-hexanediol diclycidyl ether, alkyl glycidyl ethers having from 12 to 14 carbon atoms, 2,3-epoxypropyl o-tolyl ether, or combinations of these;
    2 weight percent to 30 weight percent curing agent;
    0.1 weight percent to 70 weight percent weighting material; and
    0.1 weight percent to 20 weight percent amide accelerator;
    where the LCM composition has a density of greater than or equal to 1121 kilograms per cubic meter and is capable of being injected through a drill bit of a drill string into the lost circulation zone,
    where the lost circulation zone is a high-injectivity zone having an injectivity factor of less than or equal to 4000 pounds of force per square inch*min per barrel, in which a barrel is equal to 42 United States (U.S.) Gallons and the injectivity factor is defined as the quotient of the injection pressure in pounds of force per square inch divided by the injection rate in barrels per minute.

2. The LCM composition of claim 1 in which the LCM composition has an initial dynamic viscosity of from 2.4 kilopascal seconds (kPa*s) to 1,436 kPa*s, where the initial dynamic viscosity of the LCM composition is determined within 30 minutes after adding the curing agent to the LCM composition.

3. The LCM composition of claim 1 in which the LCM composition has a curing time less than 8 hours.

4. The LCM composition of claim 1 in which the amide accelerator comprises at least one of an amide, a polyamide, a tall oil fatty amide, a fatty polyamide, a carboxylic acid terminated fatty polyamide, a polyaminated fatty acid, an amidoamine, fatty amidoamine, a polyamidoamine, a polyolefin amide alkene amine, or combinations of these.

5. The LCM composition of claim 1 in which the amide accelerator is a polyaminated fatty acid.

6. The LCM composition of claim 5 in which the polyaminated fatty acid has the chemical formula (IX):

$R^8$—CO—NH—CH$_2$—CH$_2$—N(COR$^8$)—CH$_2$—CH$_2$—NH—CO—R$^9$ (IX)

where $R^8$ is a hydrocarbyl group and $R^9$ is a hydrocarbyl group or an alkylene carboxylate group having formula —$R^{10}$—COOH, where $R^{10}$ is a saturated or unsaturated hydrocarbylene.

7. The LCM composition of claim 1 in which the amide accelerator comprises an amidoamine having the following chemical formula (VI):

(VI)

where $R^4$ includes a saturated, unsaturated, or cyclic hydrocarbyl having from 3 to 20 carbon atoms, $R^5$ is a saturated, unsaturated, or cyclic hydrocarbyl having from 2 to 10 carbon atoms, $R^6$ is hydrogen or a hydrocarbyl having from 1 to 20 carbon atoms, and $R^7$ is hydrogen or a hydrocarbyl having from 1 to 20 carbon atoms.

8. The LCM composition of claim 1 in which the curing agent comprises at least one of at least one of trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), beta-hydroxyalkyl amide (HAA), diethyltoluenediamine (DETDA), polyoxypropylene diamine, or combinations of these.

9. The LCM composition of claim 1 in which:
    the epoxy resin comprises bisphenol-A-epichlorohydrin epoxy resin with the reactive diluent oxirane mono [($C_{12}$-$C_{14}$)-alkyloxy) methyl] derivatives and 2,3-epoxypropyl-o-tolyl ether;
    the curing agent comprises diethylenetriamine;
    the weighting material comprises barite, calcium carbonate, or combinations of these; and
    the amide accelerator comprises at least a carboxylic acid terminated fatty polyamide.

10. A method of treating a lost circulation zone of a wellbore, the method comprising:
  introducing a lost circulation material (LCM) composition into the lost circulation zone,
    the LCM composition comprising:
      20 weight percent to 97 weight percent epoxy resin;
      2 weight percent to 30 weight percent curing agent;
      0.1 weight percent to 70 weight percent weighting material; and
      0.1 weight percent to 20 weight percent amide accelerator;
    in which the LCM composition has a density of greater than or equal to 1121 kilograms per cubic meter;
    where introducing the LCM composition into the lost circulation zone comprises injecting the LCM composition through a drill bit of a drill string; and
  curing the LCM composition in the lost circulation zone to produce a barrier operable to prevent wellbore fluids from passing into the lost circulation zone,
  in which the lost circulation zone is a high-injectivity zone having an injectivity factor of less than or equal to 4000 pounds of force per square inch*min per barrel, in which a barrel is equal to 42 United States (U.S.) Gallons and the injectivity factor is defined as the quotient of the injection pressure in pounds of force per square inch divided by the injection rate in barrels per minute.

11. The method of claim 10 in which the drill string is not removed from the wellbore prior to introducing the LCM composition to the lost circulation zone.

12. The method of claim 10 further comprising introducing a displacement fluid after the LCM composition to displace the LCM composition into the lost circulation zone.

13. The method of claim 10 in which the LCM composition has a cure time of less than 8 hours and an initial dynamic viscosity of from 2.4 kilopascal seconds (kPa*s) to 1,436 kPa*s, where the initial dynamic viscosity of the LCM composition is determined within 30 minutes after adding the curing agent to the LCM composition.

14. The method of claim 10 in which the amide accelerator comprises at least one of an amide, a polyamide, a tall oil fatty amide, a fatty polyamide, a carboxylic acid terminated fatty polyamide, an amidoamine, a polyaminated fatty acid, a fatty amidoamine, a polyamidoamine, a polyolefin amide alkene amine, or combinations of these.

15. The method of claim 10 in which the amide accelerator comprises a polyaminated fatty acid.

16. The LCM composition of claim 1 in which the LCM composition consists of bisphenol-A-epichlorohydrin epoxy resin with the reactive diluent oxirane mono [($C_{12}$-$C_{14}$)-alkyloxy) methyl] derivatives, $C_{12}$-$C_{14}$ alkyl glycidyl ether, the amide accelerator, calcium carbonate weighting material, barite weighting material, and the curing agent.

17. The LCM composition of claim 1, where the epoxy resin comprises alkyl glycidyl ethers having from 12 to 14 carbon atoms.

18. The LCM composition of claim 17, where the epoxy resin further comprises bisphenol-A-epichlorohydrin epoxy resin with the reactive diluent oxirane mono [($C_{12}$-$C_{14}$)-alkyloxy) methyl] derivatives.

19. The LCM composition of claim 18, where the epoxy resin comprises:
  20 wt. % alkyl glycidyl ethers having from 12 to 14 carbon atoms; and
  80 wt. % bisphenol-A-epichlorohydrin epoxy resin with the reactive diluent oxirane mono [($C_{12}$-$C_{14}$)-alkyloxy) methyl] derivatives, where the weight percentage is based on the total weight of epoxy resins in the LCM composition.

20. A lost circulation material (LCM) composition for sealing lost circulation zones in wellbores, the LCM composition comprising:
  20 weight percent to 97 weight percent epoxy resin;
  2 weight percent to 30 weight percent curing agent;
  0.1 weight percent to 70 weight percent weighting material; and
  0.1 weight percent to 20 weight percent amide accelerator, where the polyaminated fatty acid has the chemical formula (IX):

$$R^8—CO—NH—CH_2—CH_2—N(COR^8)—CH_2—CH_2—NH—CO—R^9 \quad (IX)$$

where $R^8$ is a hydrocarbyl group and $R^9$ is a hydrocarbyl group or an alkylene carboxylate group having formula —$R^{10}$—COOH, where $R^{10}$ is a saturated or unsaturated hydrocarbylene;
  where the LCM composition has a density of greater than or equal to 1121 kilograms per cubic meter and is capable of being injected through a drill bit of a drill string into the lost circulation zone,
  where the lost circulation zone is a high-injectivity zone having an injectivity factor of less than or equal to 4000 pounds of force per square inch*min per barrel, in which a barrel is equal to 42 United States (U.S.) Gallons and the injectivity factor is defined as the quotient of the injection pressure in pounds of force per square inch divided by the injection rate in barrels per minute.

* * * * *